United States Patent
Sasaki et al.

(10) Patent No.: US 8,867,169 B2
(45) Date of Patent: Oct. 21, 2014

(54) MAGNETIC HEAD FOR PERPENDICULAR MAGNETIC RECORDING HAVING A MAIN POLE AND A SHIELD

(75) Inventors: Yoshitaka Sasaki, Santa Clara, CA (US); Hiroyuki Ito, Milpitas, CA (US); Shigeki Tanemura, Milpitas, CA (US); Kazuki Sato, Milpitas, CA (US); Yukinori Ikegawa, Milpitas, CA (US); Atsushi Iijima, Hong Kong (CN); Tatsuya Shimizu, Hong Kong (CN)

(73) Assignees: Headway Technologies, Inc., Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 13/473,159

(22) Filed: May 16, 2012

(65) Prior Publication Data
US 2013/0308227 A1    Nov. 21, 2013

(51) Int. Cl.
*G11B 5/127*    (2006.01)
*G11B 5/147*    (2006.01)

(52) U.S. Cl.
USPC ............... 360/125.26; 360/125.21

(58) Field of Classification Search
USPC .............. 360/125.56–125.63, 125.16–125.26
See application file for complete search history.

(56) References Cited

U.S. PATENT DOCUMENTS

| | | | |
|---|---|---|---|
| 6,204,997 B1 * | 3/2001 | Sasaki | 360/123.39 |
| 8,345,384 B1 * | 1/2013 | Sasaki et al. | 360/125.15 |
| 2005/0128637 A1 | 6/2005 | Johnston et al. | |
| 2005/0185337 A1 * | 8/2005 | Sasaki et al. | 360/126 |
| 2005/0271904 A1 * | 12/2005 | Li et al. | 428/842.1 |
| 2009/0103211 A1 * | 4/2009 | Chen et al. | 360/125.03 |
| 2009/0190256 A1 * | 7/2009 | Schabes et al. | 360/121 |
| 2010/0165517 A1 | 7/2010 | Araki et al. | |
| 2010/0301007 A1 | 12/2010 | Ishizaki et al. | |

FOREIGN PATENT DOCUMENTS

JP    A 2010-277676    12/2010

OTHER PUBLICATIONS

Office Action issued in Japanese Patent Application No. 2013-010383; mailed May 7, 2014; with English-language translation.

* cited by examiner

*Primary Examiner* — Adam B Dravininkas
(74) *Attorney, Agent, or Firm* — Oliff PLC

(57) ABSTRACT

A magnetic head includes a magnetic structure incorporating a write shield. The magnetic structure is formed to include a first magnetic layer, a second magnetic layer stacked on the first magnetic layer, and a seed layer. The first magnetic layer has a front end face located in the medium facing surface and a top surface. The second magnetic layer has a front end face located in the medium facing surface and a bottom surface. The top surface of the first magnetic layer includes a first region including an end located in the medium facing surface and a second region farther from the medium facing surface than the first region. The seed layer is not present on the first region of the top surface of the first magnetic layer but is present on the second region.

9 Claims, 25 Drawing Sheets

MAGNETIC HEAD FOR PERPENDICULAR MAGNETIC RECORDING HAVING A MAIN POLE AND A SHIELD

BACKGROUND OF THE INVENTION

1. Field of the Invention

The present invention relates to a magnetic head for perpendicular magnetic recording that is used for writing data on a recording medium by means of a perpendicular magnetic recording system, and more specifically, to a magnetic head for perpendicular magnetic recording that has a main pole and a shield.

2. Description of Related Art

The recording systems of magnetic read/write apparatuses include a longitudinal magnetic recording system wherein signals are magnetized in a direction along the plane of the recording medium (the longitudinal direction) and a perpendicular magnetic recording system wherein signals are magnetized in a direction perpendicular to the plane of the recording medium. It is known that the perpendicular magnetic recording system is harder to be affected by thermal fluctuation of the recording medium and capable of providing higher linear recording density, compared with the longitudinal magnetic recording system.

Magnetic heads for perpendicular magnetic recording typically have, like those for longitudinal magnetic recording, a structure where a read head section having a magnetoresistive element (hereinafter, also referred to as MR element) for reading and a write head section having an induction-type electromagnetic transducer for writing are stacked on the top surface of a substrate. The write head section includes a main pole that produces a write magnetic field in a direction perpendicular to the plane of the recording medium. The main pole includes, for example, a track width defining portion having an end located in a medium facing surface that faces the recording medium, and a wide portion that is connected to the other end of the track width defining portion and is greater in width than the track width defining portion. The track width defining portion has a generally constant width. To achieve higher recording density, it is required that the write head section of the perpendicular magnetic recording system be smaller in track width and improved in write characteristics such as overwrite property which is a parameter indicating an overwriting capability.

A magnetic head for use in a magnetic disk drive such as a hard disk drive is typically provided in a slider. The slider has the medium facing surface mentioned above. The medium facing surface has an air inflow end (a leading end) and an air outflow end (a trailing end). The slider is designed to slightly fly over the surface of the recording medium by means of an airflow that comes from the air inflow end into the space between the medium facing surface and the recording medium.

Here, the side of positions closer to the leading end relative to a reference position will be defined as the leading side, and the side of positions closer to the trailing end relative to the reference position will be defined as the trailing side. The leading side is the rear side in the direction of travel of the recording medium relative to the slider. The trailing side is the front side in the direction of travel of the recording medium relative to the slider.

The magnetic head is typically disposed near the trailing end of the medium facing surface of the slider. In a magnetic disk drive, positioning of the magnetic head is performed by a rotary actuator, for example. In this case, the magnetic head moves over the recording medium along a circular orbit about the center of rotation of the rotary actuator. In such a magnetic disk drive, a tilt of the magnetic head with respect to the tangent of the circular track, which is called a skew, occurs according to the position of the magnetic head across the tracks.

In particular, in a magnetic disk drive of the perpendicular magnetic recording system which is higher in capability of writing on a recording medium than the longitudinal magnetic recording system, the skew mentioned above can cause the phenomenon that signals already written on one or more tracks that are adjacent to a track targeted for writing are erased or attenuated during writing of a signal on the track targeted for writing (such a phenomenon will hereinafter be referred to as adjacent track erasure). For higher recording densities, it is necessary to prevent adjacent track erasure.

Providing a write shield near the main pole is effective for preventing adjacent track erasure induced by the skew mentioned above and increasing the recording density. For example, U.S. Patent Application Publication Nos. 2005/0128637 A1 and 2010/0165517 A1 each disclose a magnetic head including a write shield having an end face that is located in the medium facing surface to wrap around an end face of the main pole.

A magnetic head including a write shield is typically provided with one or more return path sections for connecting the write shield to part of the main pole away from the medium facing surface. The write shield and the one or more return path sections have the function of capturing a magnetic flux that is produced from the end face of the main pole and spreads in directions other than the direction perpendicular to the plane of the recording medium, so as to prevent the magnetic flux from reaching the recording medium. The write shield and the one or more return path sections also have the function of allowing a magnetic flux that has been produced from the end face of the main pole and has magnetized the recording medium to flow back to the main pole. The magnetic head including the write shield makes it possible to prevent adjacent track erasure and allows a further improvement of the recording density.

U.S. Patent Application Publication Nos. 2005/0128637 A1 and 2010/0165517 A1 each disclose a magnetic head including, as the aforementioned one or more return path sections, a return path section located on the leading side relative to the main pole and a return path section located on the trailing side relative to the main pole.

In general, a magnetic path including the write shield and one or more return path sections is formed as a magnetic structure including a plurality of magnetic layers. Now, a method for forming the plurality of magnetic layers constituting the magnetic structure will be discussed below. At least one of the plurality of magnetic layers constituting the magnetic structure forms the write shield. Each of the plurality of magnetic layers is formed by electroplating, for example. In a typical method for forming a magnetic layer by electroplating, a seed layer having conductivity is first formed on a surface of a structure on which the magnetic layer is to be formed. This seed layer will serve as the cathode for electroplating and as the seed for the magnetic layer to be formed by electroplating. Next, the structure with the seed layer formed thereon is immersed in an electrolytic the anode is provided. Then, using the anode and the seed layer serving as the cathode, the electrolytic solution is energized to form a plating film, which is to become the magnetic layer, on the seed layer.

The seed layer used in forming the magnetic layer in the aforementioned method constitutes part of the magnetic structure. The seed layer is preferably made of a magnetic material. In particular, to form a second magnetic layer on a first magnetic layer with the seed layer interposed therebetween, the seed layer is preferably made of a magnetic material.

Of the plurality of magnetic layers constituting the magnetic structure, the at least one magnetic layer that forms the write shield has an end face located in the medium facing surface. Another at least one magnetic layer that forms one or more return path sections may also have an end face located in the medium facing surface.

Here, a case will be contemplated where a first magnetic layer and a second magnetic layer that is formed on the first magnetic layer with a seed layer interposed therebetween each have an end face located in the medium facing surface. In this case, to form the magnetic layers by the above-described typical method employing electroplating, the seed layer interposed between the first and second magnetic layers is to have an end portion exposed in the medium facing surface.

A description will now be given of the problem with the case where a first magnetic layer and a second magnetic layer that is formed on the first magnetic layer with a seed layer interposed therebetween each have an end face located in the medium facing surface and the seed layer interposed between the first and second magnetic layers has an end portion exposed in the medium facing surface as mentioned above. If the seed layer is made of a material different from the material employed for the first and second magnetic layers, the seed layer should have features different from those of the first and second magnetic layers. Even if the same material is employed for the seed layer as that for the first and second magnetic layers, forming the seed layer by a method different from that for forming the first and second magnetic layers should make the seed layer have features different from those of the first and second magnetic layers in terms of film quality, crystal grain size, crystal structure, and the like. If the seed layer having features different from those of the first and second magnetic layers as mentioned above has an end portion present between the end face of the first magnetic layer and the end face of the second magnetic layer in the medium facing surface, magnetic field leakage from the inside to the outside of the magnetic structure tends to occur in the vicinity of the end portion of the seed layer. This may result in the occurrence of adjacent track erasure.

Aside from the aforementioned case, if the seed layer is relatively large in thickness and the end portion of the seed layer is adjacent to the end face of a magnetic layer in the medium facing surface, magnetic field leakage from the inside to the outside of the magnetic structure tends to occur in the vicinity of the boundary between the end face of the magnetic layer and the end portion of the seed layer. This may result in the occurrence of adjacent track erasure.

OBJECT AND SUMMARY OF THE INVENTION

It is an object of the present invention to provide a magnetic head for perpendicular magnetic recording and a method of manufacturing the same that make it possible to prevent the occurrence of adjacent track erasure attributable to a seed layer included in a magnetic structure.

Magnetic heads for perpendicular magnetic recording of first and second aspects of the present invention each include: a medium facing surface that faces a recording medium; a coil; a main pole; a magnetic structure made of a magnetic material; and a gap part. The coil produces a magnetic field corresponding to data to be written on the recording medium. The main pole has an end face located in the medium facing surface. The main pole allows a magnetic flux corresponding to the magnetic field produced by the coil to pass, and produces a write magnetic field for writing the data on the recording medium by means of a perpendicular magnetic recording system. The magnetic structure incorporates a write shield. The gap part is made of a nonmagnetic material and interposed between the main pole and the write shield. The write shield has an end face located in the medium facing surface.

In the magnetic head for perpendicular magnetic recording of the first aspect of the present invention, the magnetic structure is formed to include a first magnetic layer, a second magnetic layer stacked on the first magnetic layer, and a seed layer. The first magnetic layer has a front end face located in the medium facing surface and a top surface facing toward the second magnetic layer. The second magnetic layer has a front end face located in the medium facing surface and a bottom surface facing toward the first magnetic layer.

The top surface of the first magnetic layer includes a first region including an end located in the medium facing surface and a second region that is located farther from the medium facing surface than is the first region. The seed layer is not present on the first region of the top surface of the first magnetic layer but is present on the second region of the top surface of the first magnetic layer. The bottom surface of the second magnetic layer includes a first region in contact with the first region of the top surface of the first magnetic layer and a second region in contact with the seed layer.

A method of manufacturing the magnetic head for perpendicular magnetic recording of the first aspect of the present invention includes the steps of: forming the coil; forming the main pole; forming the magnetic structure; and forming the gap part. The step of forming the magnetic structure includes the steps of forming the first magnetic layer; forming the seed layer; and forming the second magnetic layer by plating with the seed layer and the first magnetic layer used as a seed and a cathode.

In the method of manufacturing the magnetic head for perpendicular magnetic recording of the first aspect of the present invention, the step of forming the magnetic structure may further include the step of removing part of the seed layer after the second magnetic layer is formed.

In the magnetic head for perpendicular magnetic recording of the first aspect of the present invention and the method of manufacturing the same, each of the first magnetic layer and the second magnetic layer may be a component of the write shield.

In the magnetic head for perpendicular magnetic recording of the first aspect of the present invention and the method of manufacturing the same, the magnetic structure may further incorporate a return path section that connects the write shield and part of the main pole away from the medium facing surface to each other. In this case, the first magnetic layer may be a component of the return path section while the second magnetic layer may be a component of the write shield. Alternatively, the first magnetic layer may be a component of the write shield while the second magnetic layer may be a component of the return path section.

In the magnetic head for perpendicular magnetic recording of the second aspect of the present invention, the magnetic structure is formed to include a seed layer and a magnetic layer that is formed on the seed layer. The seed layer includes a first portion and a second portion. The second portion is located away from the medium facing surface. The first portion is located between the second portion and the medium facing surface. The first portion is smaller than the second portion in thickness.

The magnetic layer has a front end face located in the medium facing surface, and a bottom surface. The bottom surface of the magnetic layer includes a first region in contact with the first portion of the seed layer and a second region in contact with the second portion of the seed layer.

A method of manufacturing the magnetic head for perpendicular magnetic recording of the second aspect of the present invention includes the steps of: forming the coil; forming the main pole; forming the magnetic structure; and forming the gap part. The step of forming the magnetic structure includes the steps of forming the seed layer; and forming the magnetic layer by plating with the seed layer used as a seed and a cathode.

In the method of manufacturing the magnetic head for perpendicular magnetic recording of the second aspect of the present invention, the step of forming the magnetic structure may further include the step of removing part of the seed layer after the magnetic layer is formed.

In the magnetic head for perpendicular magnetic recording of the second aspect of the present invention and the method of manufacturing the same, the magnetic layer may be a component of the write shield.

In the magnetic head for perpendicular magnetic recording of the second aspect of the present invention and the method of manufacturing the same, the magnetic structure may further incorporate a return path section that connects the write shield and part of the main pole away from the medium facing surface to each other. In this case, the magnetic layer may be a component of the return path section.

In the magnetic head for perpendicular magnetic recording of the first aspect of the present invention and the method of manufacturing the same, the top surface of the first magnetic layer includes a first region including an end located in the medium facing surface and a second region that is located farther from the medium facing surface than is the first region. The seed layer is present on the second region of the top surface of the first magnetic layer, and not on the first region of the top surface of the first magnetic layer. According to the magnetic head for perpendicular magnetic recording of the first aspect of the present invention and the method of manufacturing the same, it is thus possible to prevent the occurrence of adjacent track erasure attributable to the seed layer.

In the magnetic head for perpendicular magnetic recording of the second aspect of the present invention and the method of manufacturing the same, the seed layer includes a first portion and a second portion. The second portion is located away from the medium facing surface, and the first portion is located between the second portion and the medium facing surface. The first portion is smaller than the second portion in thickness. According to the magnetic head for perpendicular magnetic recording of the second aspect of the present invention and the method of manufacturing the same, it is thus possible to prevent the occurrence of adjacent track erasure attributable to the seed layer.

Other objects, features and advantages of the present invention will become fully apparent from the following description.

DETAILED DESCRIPTION OF THE PREFERRED EMBODIMENTS

First Embodiment

Figure 1:
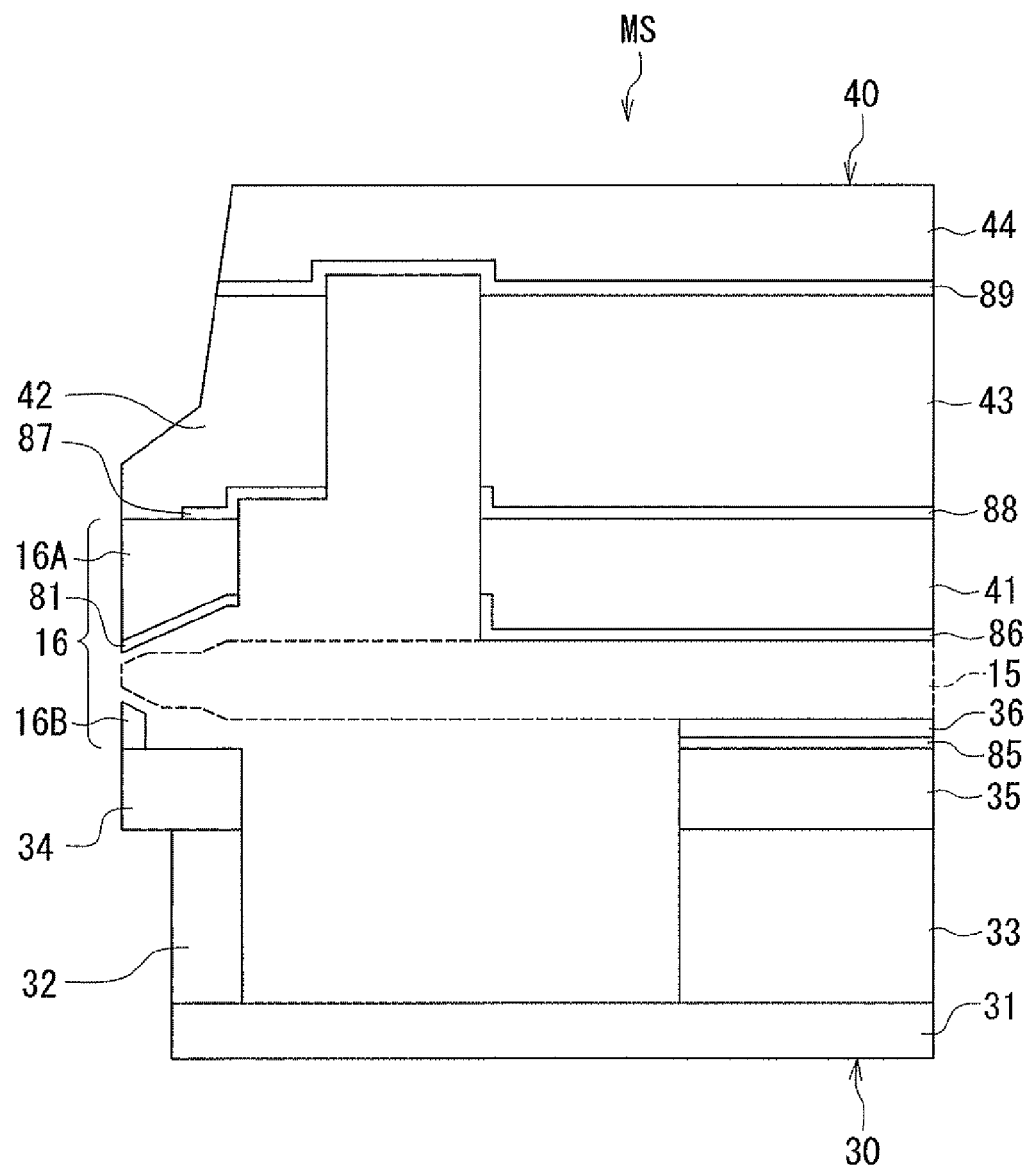
FIG. 1 is a cross-sectional view showing a magnetic structure in a magnetic head according to a first embodiment of the invention.
Figure 2:
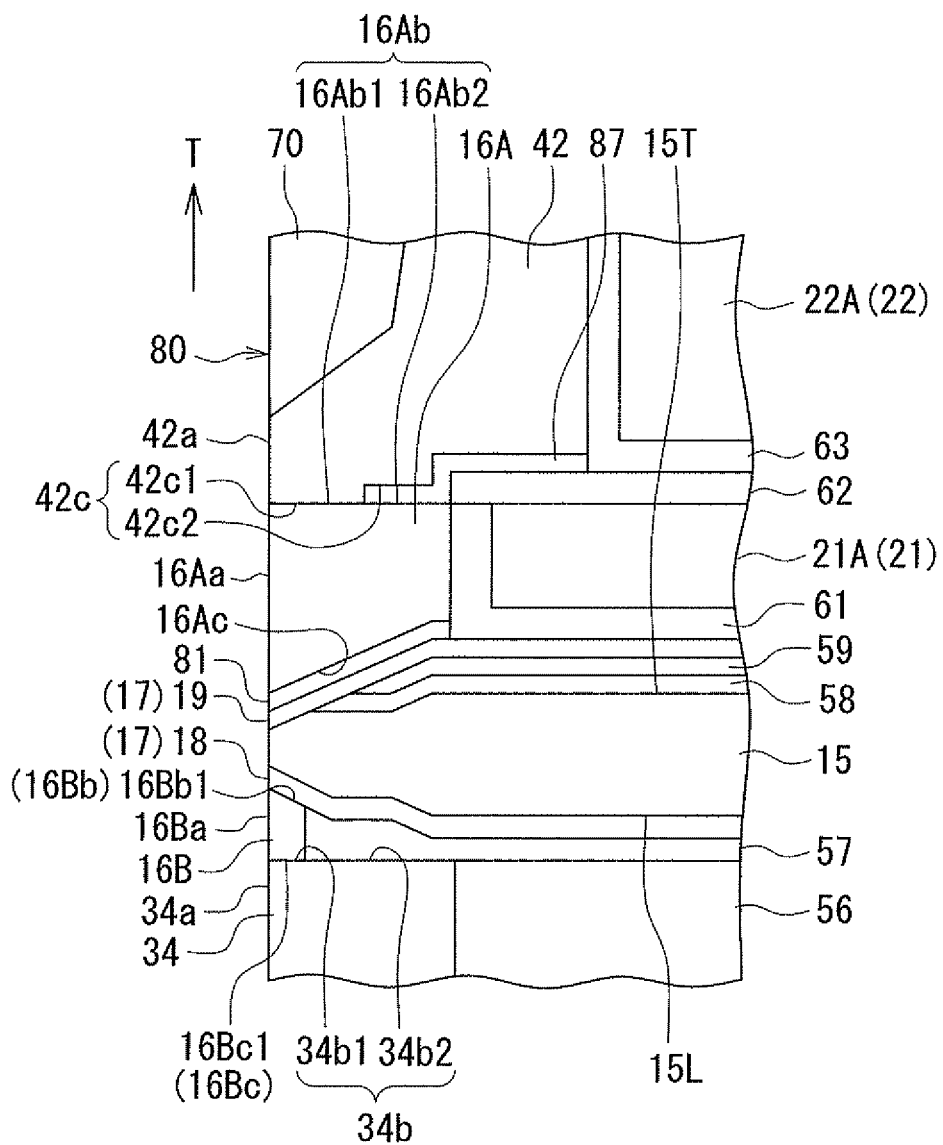
FIG. 2 is a cross-sectional view showing the main part of the magnetic head according to the first embodiment of the invention.
Figure 3:
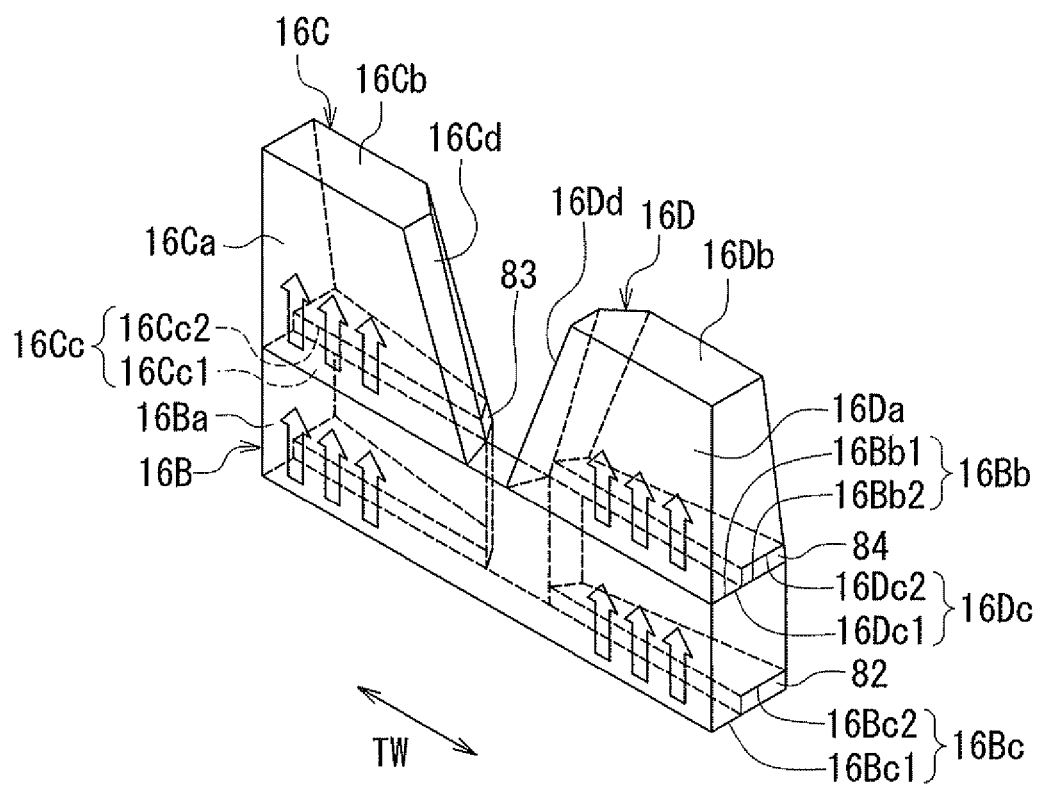
FIG. 3 is a perspective view showing a second shield and two side shields of the magnetic head according to the first embodiment of the invention.
Figure 4:
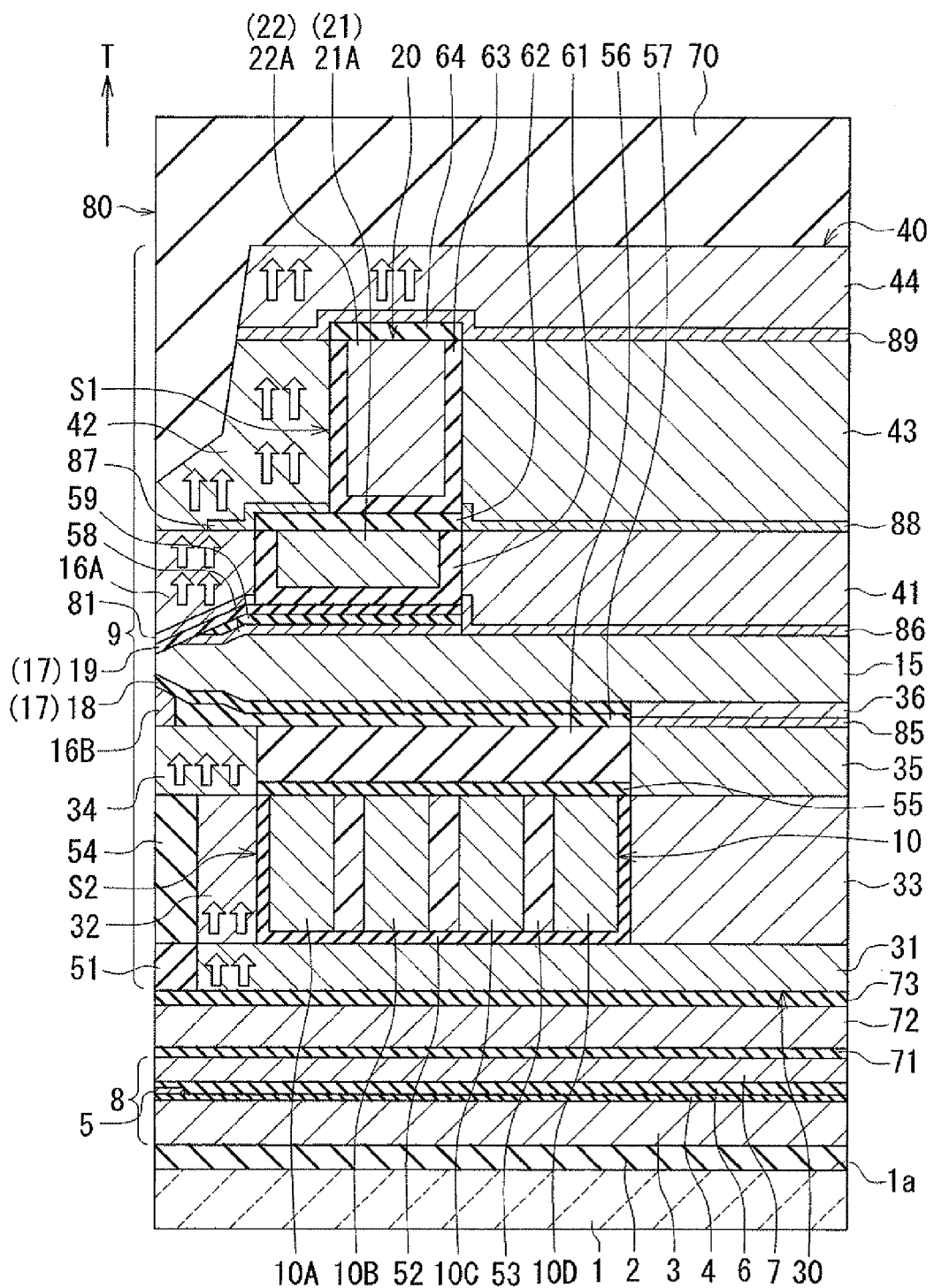
FIG. 4 is a cross-sectional view of the magnetic head according to the first embodiment of the invention.
Figure 5:
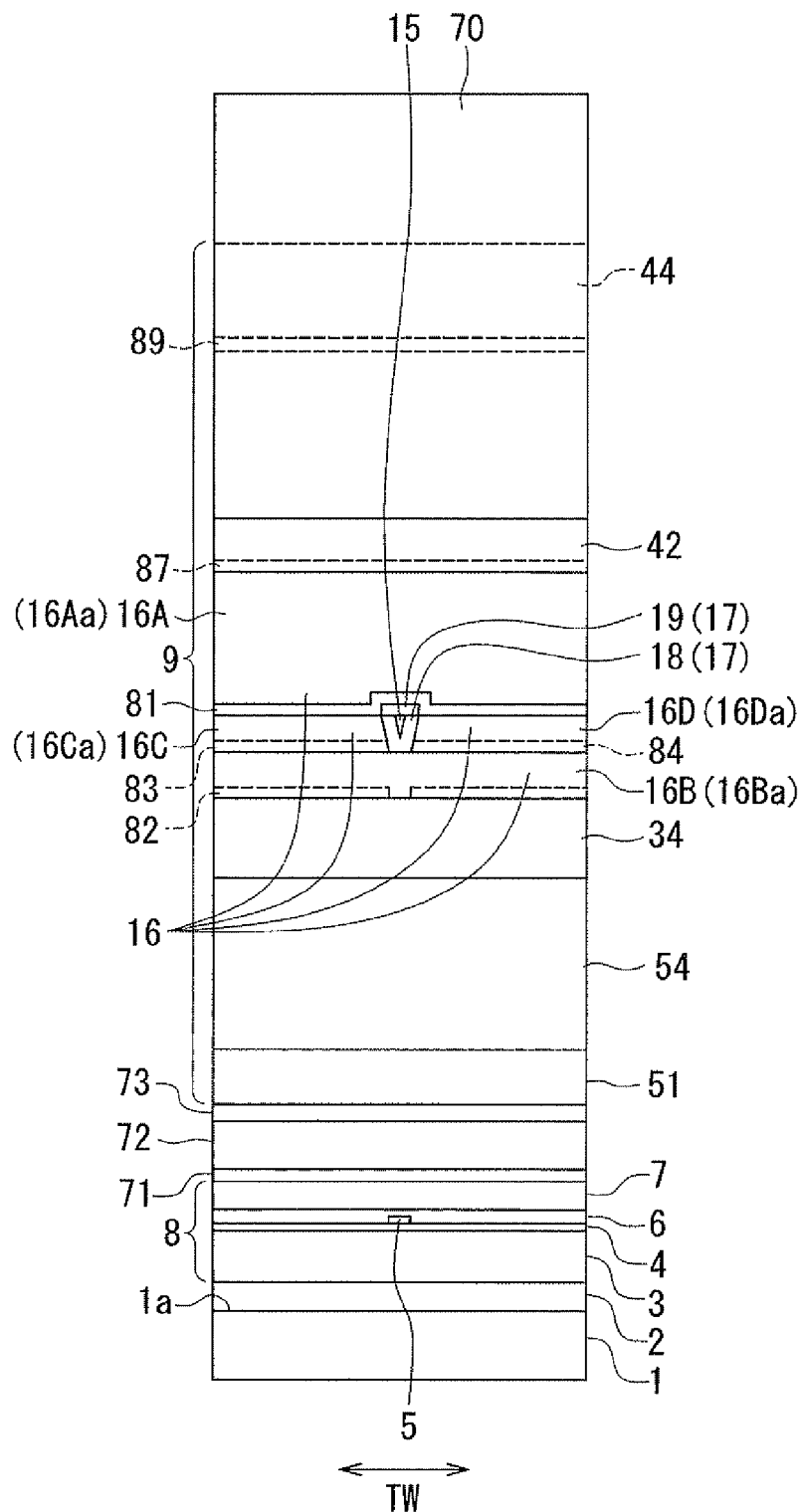
FIG. 5 is a front view showing the medium facing surface of the magnetic head according to the first embodiment of the invention.
Figure 6:
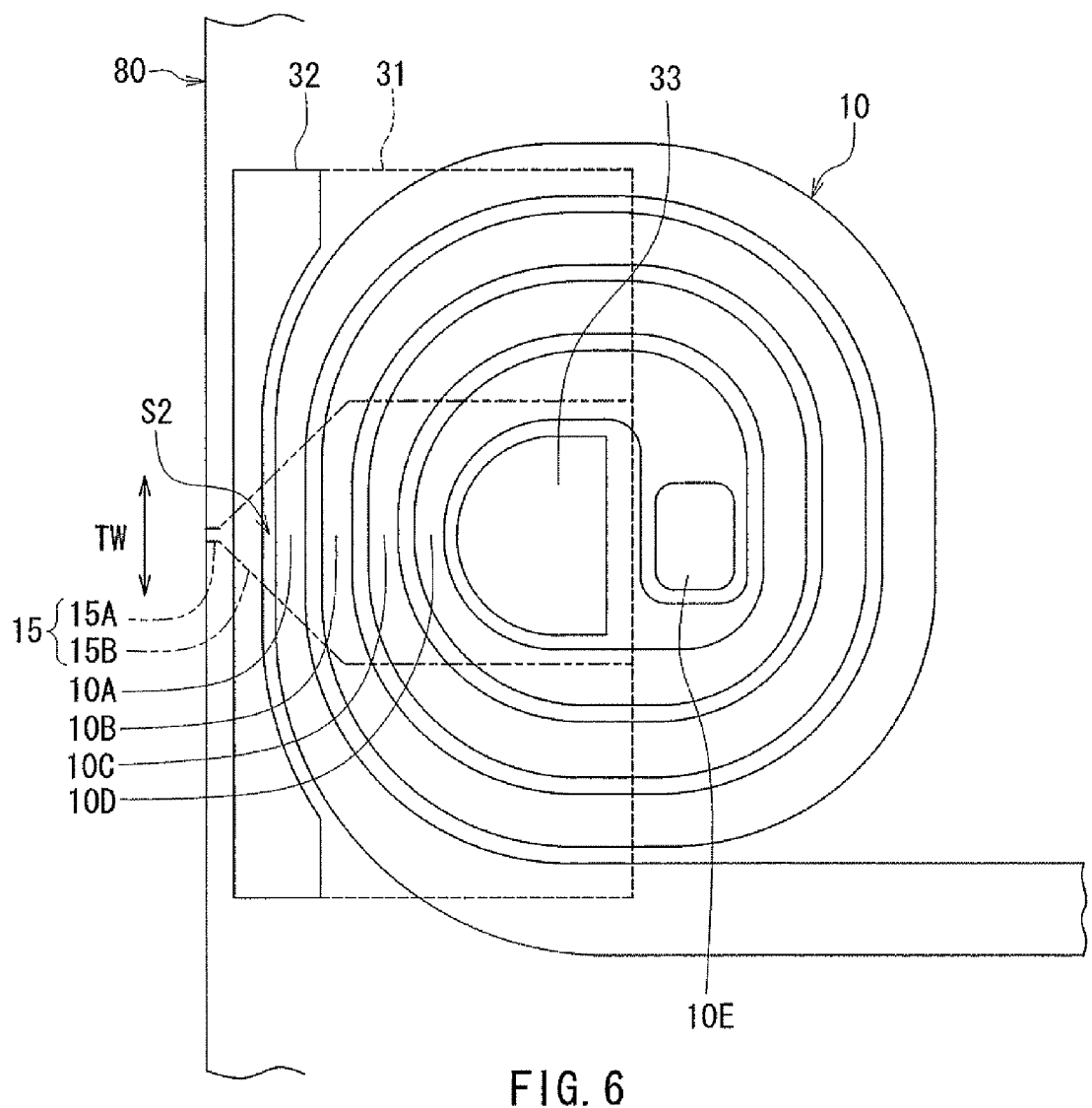
FIG. 6 is a plan view showing a second portion of a coil of the magnetic head according to the first embodiment of the invention.
Figure 7:
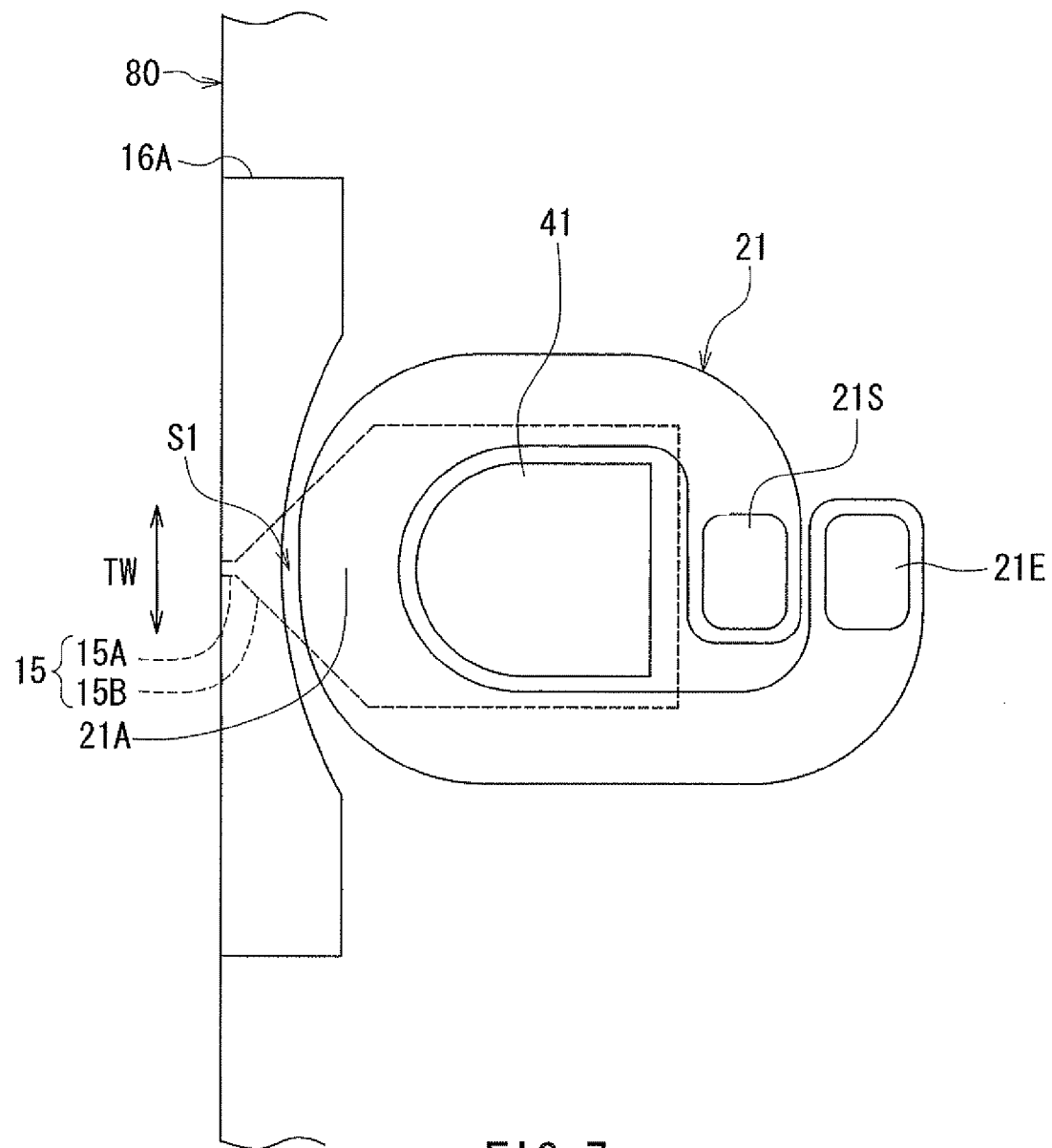
FIG. 7 is a plan view showing a first layer of a first portion of the coil of the magnetic head according to the first embodiment of the invention.
Figure 8:
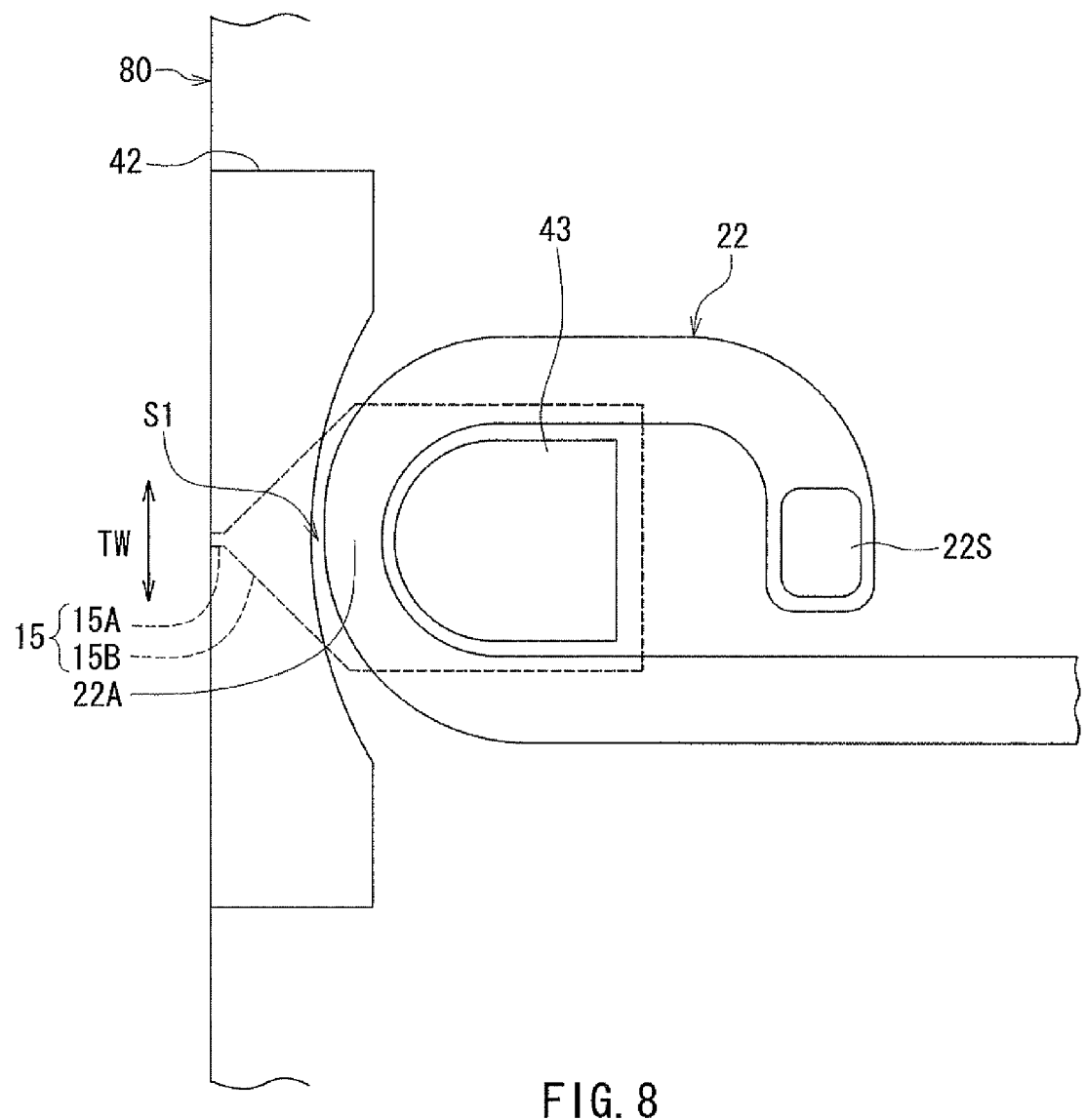
FIG. 8 is a plan view showing a second layer of the first portion of the coil of the magnetic head according to the first embodiment of the invention.

Embodiments of the present invention will now be described in detail with reference to the drawings. First, reference is made to FIG. 1 to FIG. 8 to describe the configuration of a magnetic head according to a first embodiment of the invention. FIG. 1 is a cross-sectional view showing a magnetic structure in the magnetic head according to the present embodiment. FIG. 2 is a cross-sectional view showing the main part of the magnetic head according to the present embodiment. FIG. 3 is a perspective view showing a second shield and two side shields of the magnetic head according to the present embodiment. FIG. 4 is a cross-sectional view of the magnetic head according to the present embodiment. FIG. 5 is a front view showing the medium facing surface of the magnetic head according to the present embodiment. FIG. 6 is a plan view showing a second portion of a coil of the magnetic head according to the present embodiment. FIG. 7 is a plan view showing a first layer of a first portion of the coil of the magnetic head according to the present embodiment. FIG. 8 is a plan view showing a second layer of the first portion of the coil of the magnetic head according to the present embodiment. Note that FIG. 1, FIG. 2 and FIG. 4 show cross sections perpendicular to the medium facing surface and to the top surface of the substrate. In FIG. 2 and FIG. 4, the arrows with the symbol T indicate the direction of travel of a recording medium. In FIG. 3 and FIG. 5 to FIG. 8, the arrows with the symbol TW in indicate the track width direction. The hollow arrows in FIG. 3 and FIG. 4 indicate the direction of growth of plating films to form magnetic layers.

As shown in FIG. 4 and FIG. 5, the magnetic head for perpendicular magnetic recording (hereinafter simply referred to as the magnetic head) according to the present embodiment includes: a substrate 1 made of a ceramic material such as aluminum oxide-titanium carbide ($Al_2O_3$—TiC) and having a top surface 1a; an insulating layer 2 made of an insulating material such as alumina ($Al_2O_3$) and disposed on the top surface 1a of the substrate 1; a first read shield layer 3 made of a magnetic material and disposed on the insulating layer 2; a first read shield gap film 4 which is an insulating film disposed to cover the first read shield layer 3; a magnetoresistive (MR) element 5 serving as a read element disposed on the first read shield gap film 4; a second read shield gap film 6 which is an insulating film disposed on the MR element 5; and a second read shield layer 7 made of a magnetic material and disposed on the second read shield gap film 6.

An end of the MR element 5 is located in a medium facing surface 80 that faces the recording medium. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current for use in magnetic signal detection is fed in a direction generally parallel to the plane of layers constituting the GMR element or the current-perpendicular-to-plane (CPP) type in which the current for use in magnetic signal detection is fed in a direction generally perpendicular to the plane of the layers constituting the GMR element.

The parts from the first read shield layer 3 to the second read shield layer 7 constitute a read head section 8. The magnetic head further includes: a nonmagnetic layer 71 made of a nonmagnetic material and disposed on the second read shield layer 7; a middle shield layer 72 made of a magnetic material and disposed on the nonmagnetic layer 71; a nonmagnetic layer 73 made of a nonmagnetic material and disposed on the middle shield layer 72; and a write head section 9 disposed on the nonmagnetic layer 73. The middle shield layer 72 has the function of shielding the MR element 5 from magnetic fields generated in the write head section 9. The nonmagnetic layers 71 and 73 are made of alumina, for example. The write head section 9 includes a coil, a main pole 15, a magnetic structure MS (see FIG. 1), and a gap part 17.

The coil produces a magnetic field corresponding to data to be written on the recording medium. The coil includes a first portion 20 and a second portion 10. The first portion 20 and the second portion 10 are both made of a conductive material such as copper. The first portion 20 and the second portion 10 are connected in series or in parallel. The main pole 15 has an end face located in the medium facing surface 80. The main pole 15 allows a magnetic flux corresponding to the magnetic field produced by the coil to pass, and produces a write magnetic field for writing data on the recording medium by means of a perpendicular magnetic recording system. FIG. 1, FIG. 2, and FIG. 4 each show a cross section that intersects the end face of the main pole 15 located in the medium facing surface 80 and that is perpendicular to the medium facing surface 80 and to the top surface 1a of the substrate 1 (the cross section will hereinafter be referred to as the main cross section).

As shown in FIG. 1, the magnetic structure MS incorporates a write shield 16, a first return path section 40, and a second return path section 30. The write shield 16 has an end face located in the medium facing surface 80. As shown in FIG. 5, the end face of the write shield 16 includes first to fourth end face portions 16Aa, 16Ba, 16Ca, and 16Da. The first end face portion 16Aa is located on the front side in the direction T of travel of the recording medium relative to the end face of the main pole 15. The second end face portion 16Ba is located on the rear side in the direction T of travel of the recording medium relative to the end face of the main pole 15. The third and fourth end face portions 16Ca and 16Da are located on opposite sides of the end face of the main pole 15 in the track width direction TW. In the medium facing surface 80, the first to fourth end face portions 16Aa, 16Ba, 16Ca, and 16Da are arranged to wrap around the end face of the main pole 15.

As shown in FIG. 4, the first return path section 40 and the second return path section 30 align along a direction perpendicular to the top surface 1a of the substrate 1 with the main pole 15 interposed therebetween. The first return path section 40 is located on the front side in the direction T of travel of the recording medium relative to the main pole 15, and connects the write shield 16 and part of the main pole 15 away from the medium facing surface 80 to each other, thereby magnetically coupling the write shield 16 and the main pole 15 to each other. The second return path section 30 is located on the rear side in the direction T of travel of the recording medium relative to the main pole 15, and connects the write shield 16 and part of the main pole 15 away from the medium facing surface 80 to each other, thereby magnetically coupling the write shield 16 and the main pole 15 to each other.

The magnetic structure MS (the write shield 16, the first return path section 40, and the second return path section 30) is made of a magnetic material. The material employed for the magnetic structure MS may be CoFeN, CoNiFe, NiFe, or CoFe, for example.

The second return path section 30 includes magnetic layers 31, 32, 33, 34, 35, and 36 that have conductivity. The magnetic layer 31 is located on the nonmagnetic layer 73. The magnetic layers 32 and 33 are both located on the magnetic layer 31. The magnetic layer 32 lies in the vicinity of the medium facing surface 80. The magnetic layer 33 is located farther from the medium facing surface 80 than is the magnetic layer 32. Each of the magnetic layers 31 and 32 has an end face that faces toward the medium facing surface 80, the end face being located at a distance from the medium facing surface 80. As shown in FIG. 6, the second portion 10 of the coil is wound approximately four turns around the magnetic layer 33.

The magnetic head further includes: an insulating layer 51 made of an insulating material, disposed on the nonmagnetic layer 73 and surrounding the magnetic layer 31; an insulating film 52 made of an insulating material and interposed between the second portion 10 and the magnetic layers 31 to 33; an insulating layer 53 made of an insulating material and disposed in the space between every adjacent turns of the second portion 10; and an insulating layer 54 made of an insulating material and disposed around the second portion 10 and the magnetic layer 32. The top surfaces of the second portion 10, the magnetic layers 32 and 33, the insulating film 52 and the insulating layers 53 and 54 are even with each other. The insulating layers 51 and 54 and the insulating film 52 are made of alumina, for example. The insulating layer 53 is made of photoresist, for example.

The magnetic layer 34 is disposed over the magnetic layer 32 and the insulating layer 54. As shown in FIG. 2, the magnetic layer 34 has a front end face 34a located in the medium facing surface 80, and a top surface 34b. The magnetic layer 35 is located on the magnetic layer 33. The magnetic head further includes insulating layers 55 and 56 each made of an insulating material. The insulating layer 55 is disposed over the top surfaces of the second portion 10, the insulating film 52 and the insulating layers 53 and 54. The insulating layer 56 lies on the insulating layer 55 and surrounds the magnetic layers 34 and 35. The top surfaces of the magnetic layers 34 and 35 and the insulating layer 56 are even with each other. The insulating layers 55 and 56 are made of alumina, for example.

As shown in FIG. 5, the write shield 16 includes a first shield 16A, a second shield 16B, and two side shields 16C and 16D, which are magnetic layers having conductivity. The two side shields 16C and 16D are located on opposite sides of the main pole 15 in the track width direction TW. The first shield 16A is located on the front side in the direction T of travel of the recording medium relative to the main pole 15. The second shield 16B is located on the rear side in the direction T of travel of the recording medium relative to the main pole 15. The side shields 16C and 16D magnetically couple the first shield 16A and the second shield 16B to each other.

As shown in FIG. 2, the first shield 16A has the first end face portion 16Aa, which is a front end face located in the medium facing surface 80, and has a top surface 16Ab and a bottom surface 16Ac. The distance from the top surface 1a of the substrate 1 to an arbitrary point on the bottom surface 16Ac increases with increasing distance from the arbitrary point to the medium facing surface 80. The second shield 16B has the second end face portion 16Ba, which is a front end face located in the medium facing surface 80, and has a top surface 16Bb and a bottom surface 16Bc. The distance from the top surface 1a of the substrate 1 to an arbitrary point on the top surface 16Bb decreases with increasing distance from the arbitrary point to the medium facing surface 80. As shown in FIG. 3, the side shield 16C has the third end face portion 16Ca, which is a front end face located in the medium facing surface 80, and has a top surface 16Cb and a bottom surface 16Cc. The side shield 16D has the fourth end face portion 16Da, which is a front end face located in the medium facing surface 80, and has a top surface 16Db and a bottom surface 16Dc.

The write shield 16 further includes seed layers 81, 82, 83, and 84 that have conductivity. As will be described in detail later, the seed layers 81, 82, 83, and 84 are used in forming the shields 16A, 16B, 16C, and 16D, respectively, by plating.

The second shield 16B is stacked on the magnetic layer 34. The seed layer 82 is interposed in part between the magnetic layer 34 and the second shield 16B. The location of the seed layer 82 will be described in detail later.

The magnetic layer 36 is located above the magnetic layer 35. The second return path section 30 further includes a seed layer 85 that has conductivity and is interposed between the magnetic layer 35 and the magnetic layer 36. As will be described in detail later, the seed layer 85 is used in forming the magnetic layer 36 by plating.

The magnetic head further includes a nonmagnetic layer 57 made of a nonmagnetic material. The nonmagnetic layer 57 is disposed on part of the top surface of the magnetic layer 34 and the top surface of the insulating layer 56, and surrounds the second shield 16B, the magnetic layer 36, and the seed layers 82 and 85. The nonmagnetic layer 57 is made of alumina, for example.

The main pole 15 has a top surface 15T (see FIG. 2), which is a surface located at an end on the front side in the direction T of travel of the recording medium, and a bottom end 15L (see FIG. 2) opposite to the top surface 15T. The main pole 15 further has first and second side parts (see FIG. 5) that are opposite to each other in the track width direction TW. The side shield 16C has a sidewall 16Cd (see FIG. 3) opposed to the first side part of the main pole 15. The side shield 16D has a sidewall 16Dd (see FIG. 3) opposed to the second side part of the main pole 15.

The gap part 17 is interposed between the main pole 15 and the write shield 16. The magnetic head further includes a first gap layer 19 made of a nonmagnetic material and a second gap layer 18 made of a nonmagnetic material. A portion of the first gap layer 19 constitutes a portion of the gap part 17. A portion of the second gap layer 18 constitutes another portion of the gap part 17. The portion of the first gap layer 19 constituting the portion of the gap part 17 is located between the main pole 15 and the first shield 16A. The portion of the second gap layer 18 constituting the other portion of the gap part 17 is located between the main pole 15 and each of the second shield 16B and the side shields 16C and 16D.

Each of the side shields 16C and 16D is stacked on the second shield 16B. The seed layer 83 is interposed in part between the second shield 16B and the side shield 16C. The seed layer 84 is interposed in part between the second shield 16B and the side shield 16D. The locations of the seed layers 83 and 84 will be described in detail later.

The second gap layer 18 is arranged to extend along the sidewall 16Cd of the side shield 16C, the sidewall 16Dd of the side shield 16D, the top surface 16Bb of the second shield 16B, and the top surface of the nonmagnetic layer 57. The nonmagnetic material employed to form the second gap layer 18 may be an insulating material or a nonmagnetic metal material. Alumina is an example of insulating materials that can be used to form the second gap layer 18. Ru is an example of nonmagnetic metal materials that can be used to form the second gap layer 18.

The main pole 15 is disposed over the second shield 16B and the nonmagnetic layer 57 such that the second gap layer 18 is interposed between the main pole 15 and each of the top surface 16Bb of the second shield 16B and the top surface of the nonmagnetic layer 57. As shown in FIG. 5, the second gap layer 18 is interposed also between the main pole 15 and each of the side shields 16C and 16D.

The bottom end 15L of the main pole 15 is in contact with the top surface of the magnetic layer 36 at a position away from the medium facing surface 80. The main pole 15 is made of a magnetic metal material. Examples of materials that can be used for the main pole 15 include NiFe; CoNiFe, and CoFe. The shape of the main pole 15 will be described in detail later.

The magnetic head further includes a first nonmagnetic layer (not shown) made of a nonmagnetic material and disposed around the main pole 15 and the side shields 16C and 16D. In the present embodiment, the first nonmagnetic layer is made of a nonmagnetic insulating material such as alumina, in particular.

The magnetic head further includes: a nonmagnetic metal layer 58 made of a nonmagnetic metal material and disposed on part of the top surface 15T of the main pole 15 at a position away from the medium facing surface 80; and an insulating layer 59 made of an insulating material and disposed on the top surface of the nonmagnetic metal layer 58. The nonmagnetic metal layer 58 is made of Ru, NiCr, or NiCu, for example. The insulating layer 59 is made of alumina, for example.

The first gap layer 19 is disposed to cover the main pole 15, the nonmagnetic metal layer 58 and the insulating layer 59. The first gap layer 19 may be made of a nonmagnetic insulating material such as alumina or a nonmagnetic conductive material such as Ru, NiCu, Ta, W, NiB, or NiP. Alternatively, the first gap layer 19 may include a first layer made of a nonmagnetic insulating material and a second layer made of a nonmagnetic conductive material and stacked on the first layer.

The first shield 16A is disposed above the side shields 16C and 16D and the first gap layer 19. The seed layer 81 is interposed between the first shield 16A and each of the side shields 16C and 16D and the first gap layer 19.

In the medium facing surface 80, part of the first end face portion 16Aa of the first shield 16A is spaced from the end face of the main pole 15 by a predetermined distance created by the thicknesses of the first gap layer 19 and the seed layer 81. The thickness of the first gap layer 19 preferably falls within the range of 5 to 60 nm, and may be 30 to 60 nm, for example. The end face of the main pole 15 has a side that is adjacent to the first gap layer 19, and the side defines the track width.

The first return path section 40 includes magnetic layers 41, 42, 43, and 44 that have conductivity, and seed layers 86, 87, 88, and 89 that have conductivity. As will be described in detail later, the seed layers 86, 87, 88, and 89 are used in forming the magnetic layers 41, 42, 43, and 44, respectively, by plating.

The magnetic layer 41 is located away from the medium facing surface 80 and lies above the main pole 15. The seed layer 86 is interposed between the main pole 15 and the magnetic layer 41.

The first portion 20 of the coil includes a first layer 21 and a second layer 22. As shown in FIG. 7, the first layer 21 is wound one turn around the magnetic layer 41. The magnetic head further includes an insulating film 61 made of an insulating material and interposed between the first layer 21 and each of the first shield 16A, the first gap layer 19 and the magnetic layer 41, and a second nonmagnetic layer (not shown) made of a nonmagnetic material and disposed around the first layer 21, the first shield 16A and the seed layer 81. The insulating film 61 is made of alumina, for example. The second nonmagnetic layer is made of an inorganic insulating material, for example. The inorganic insulating material may be alumina or silicon oxide, for example. The top surfaces of the first shield 16A, the first layer 21, the magnetic layer 41, the insulating film 61 and the second nonmagnetic layer are even with each other.

The magnetic head further includes an insulating layer 62 made of an insulating material and disposed over the top surfaces of the first layer 21 and the insulating film 61. The insulating layer 62 is made of alumina, for example.

The magnetic layer 42 is stacked on the first shield 16A. The seed layer 87 is interposed in part between the first shield 16A and the magnetic layer 42, and is also interposed between the insulating layer 62 and the magnetic layer 42. The location of the seed layer 87 will be described in detail later.

As shown in FIG. 2, the magnetic layer 42 has: a front end face 42a located in the medium facing surface 80; a top surface; a bottom surface 42c; and first and second connecting surfaces connecting the front end face 42a and the top surface to each other. In the magnetic layer 42, one end of the first connecting surface is located in the medium facing surface 80, the other end of the first connecting surface is connected to one end of the second connecting surface, and the other end of the second connecting surface is connected to the top surface. The distance from the medium facing surface 80 to an arbitrary point on each of the first and second connecting surfaces increases with increasing distance from the arbitrary point to the top surface 1a of the substrate 1. The angle of inclination of the second connecting surface relative to the direction perpendicular to the medium facing surface 80 is greater than the angle inclination of the first connecting surface relative to the direction perpendicular to the medium facing surface 80.

The magnetic layer 43 is located above the magnetic layer 41. The seed layer 88 is interposed between the magnetic layer 41 and the magnetic layer 43. As shown in FIG. 8, the second layer 22 is wound approximately one turn around the magnetic layer 43. The magnetic head further includes an insulating film 63 made of an insulating material and interposed between the second layer 22 and each of the magnetic layers 42 and 43 and the insulating layer 62, and a not-shown insulating layer disposed around the second layer 22 and the magnetic layer 42. The top surfaces of the second layer 22, the magnetic layers 42 and 43, the insulating film 63, and the not-shown insulating layer are even with each other. The magnetic head further includes an insulating layer 64 made of an insulating material and disposed over the top surfaces of the second layer 22 and the insulating film 63. The insulating film 63, the insulating layer 64 and the not-shown insulating layer are made of alumina, for example.

The magnetic layer 44 is located above the magnetic layers 42 and 43 and the insulating layer 64, and magnetically connects the magnetic layers 42 and 43 to each other. The seed layer 89 is interposed between the magnetic layer 44 and each of the magnetic layers 42 and 43 and the insulating layer 64. The magnetic layer 44 has an end face facing toward the medium facing surface 80. This end face is located at a distance from the medium facing surface 80. The distance from the medium facing surface 80 to an arbitrary point on the end face of the magnetic layer 44 increases with increasing distance from the arbitrary point to the top surface 1a of the substrate 1.

The magnetic head further includes a protective layer 70 made of a nonmagnetic material and disposed to cover the write head section 9. The protective layer 70 is made of, for example, an inorganic insulating material such as alumina.

As has been described, the magnetic head according to the present embodiment includes the medium facing surface 80, the read head section 8, and the write head section 9. The medium facing surface 80 faces a recording medium. The read head section 8 and the write head section 9 are stacked on the substrate 1. The read head section 8 is located on the rear side in the direction T of travel of the recording medium (i.e., located on the leading side) relative to the write head section 9.

The read head section 8 includes: the MR element 5 serving as the read element; the first read shield layer 3 and the second read shield layer 7 for shielding the MR element 5, with their respective portions near the medium facing surface 80 opposed to each other with the MR element 5 therebetween; the first read shield gap film 4 disposed between the MR element 5 and the first read shield layer 3; and the second read shield gap film 6 disposed between the MR element 5 and the second read shield layer 7.

The write head section 9 includes the coil including the first portion 20 and the second portion 10, the main pole 15, the magnetic structure MS, and the gap part 17. The magnetic structure MS incorporates the write shield 16, the first return path section 40, and the second return path section 30. The write shield 16 includes the first shield 16A, the second shield 16B, the two side shields 16C and 16D, and the seed layers 81 to 84. The gap part 17 is composed of part of the first gap layer 19 and part of the second gap layer 18. The first return path section 40 and the second return path section 30 align along the direction perpendicular to the top surface 1a of the substrate 1 with the main pole 15 interposed therebetween.

The first return path section 40 includes the magnetic layers 41 to 44 and the seed layers 86 to 89. The first return path section 40 is located on the front side in the direction T of travel of the recording medium relative to the main pole 15. As shown in FIG. 4, the first return path section 40 connects the write shield 16 and part of the main pole 15 away from the medium facing surface 80 to each other so that a first space S1 is defined by the main pole 15, the gap part 17 (part of the gap layer 19), the write shield 16, and the first return path section 40 (the magnetic layers 41 to 44 and the seed layers 86 to 89).

The second return path section 30 includes the magnetic layers 31 to 36 and the seed layer 85. The second return path section 30 is located on the rear side in the direction T of travel of the recording medium relative to the main pole 15. As shown in FIG. 4, the second return path section 30 connects the write shield 16 and part of the main pole 15 away from the medium facing surface 80 to each other so that a second space S2 is defined by the main pole 15, the gap part 17 (part of the gap layer 18), the write shield 16, and the second return path section 30 (the magnetic layers 31 to 36 and the seed layer 85).

The configuration of the magnetic structure MS, including the arrangement of the seed layers 82 to 84 and 87, will now be described in detail with reference to FIG. 1 to FIG. 3 and FIG. 5. A portion of the magnetic structure MS, the portion consisting of the magnetic layer 34, the second shield 16B and the seed layer 82, will be described first. The magnetic structure MS is formed to include the magnetic layer 34, the second shield 16B stacked on the magnetic layer 34, and the seed layer 82. The magnetic layer 34 has the top surface 34b facing toward the second shield 16B. The second shield 16B has the bottom surface 16Bc facing toward the magnetic layer 34.

As shown in FIG. 2, the top surface 34b of the magnetic layer 34 includes a first region 34b1 including an end located in the medium facing surface 80, and a second region 34b2 that is located farther from the medium facing surface 80 than is the first region 34b1. The seed layer 82 is not present on the first region 34b1 but is present on the second region 34b2 (see FIG. 3 and FIG. 5).

As shown in FIG. 2 and FIG. 3, the bottom surface 16Bc of the second shield 16B includes a first region 16Bc1 in contact with the first region 34b1 of the top surface 34b of the magnetic layer 34 and a second region 16Bc2 in contact with the seed layer 82. As viewed from the seed layer 82, the magnetic layer 34 corresponds to the "first magnetic layer" according to the invention, and the second shield 16B corresponds to the "second magnetic layer" according to the invention.

Now, a description will be given of a portion of the magnetic structure MS that consists of the second shield 16B, the side shields 16C and 16D, and the seed layers 83 and 84. The magnetic structure MS is formed to include the second shield 16B, the side shields 16C and 16D each stacked on the second shield 16B, and the seed layers 83 and 84. The second shield 16B has the top surface 16Bb facing toward the side shields 16C and 16D. The side shield 16C has the bottom surface 16Cc facing toward the second shield 16B. The side shield 16D has the bottom surface 16Dc facing toward the side shield 16B.

As shown in FIG. 2 and FIG. 3, the top surface 16Bb of the second shield 16B includes a first region 16Bb1 including an end located in the medium facing surface 80, and a second region 16Bb2 that is located farther from the medium facing surface 80 than is the first region 16Bb1. The seed layers 83 and 84 are not present on the first region 16Bb1 but are present on the second region 16Bb2. The second region 16Bb2 includes a portion located below the seed layer 83 and a portion located below the seed layer 84.

As shown in FIG. 3, the bottom surface 16Cc of the side shield 16C includes a first region 16Cc1 in contact with the first region 16Bb1 of the top surface 16Bb of the second shield 16B and a second region 16Cc2 in contact with the seed layer 83. The bottom surface 16Dc of the side shield 16D includes a first region 16Dc1 in contact with the first region 16Bb1 of the top surface 16Bb of the second shield 16B and a second region 16Dc2 in contact with the seed layer 84. As viewed from the seed layers 83 and 84, the second shield 16B corresponds to the "first magnetic layer" according to the invention, and the side shields 16C and 16D correspond to the "second magnetic layer" according to the invention.

A portion of the magnetic structure MS that consists of the first shield 16A, the magnetic layer 42, and the seed layer 87 will now be described. The magnetic structure MS is formed to include the first shield 16A, the magnetic layer 42 stacked on the first shield 16A, and the seed layer 87. The first shield 16A has the top surface 16Ab facing toward the magnetic layer 42. The magnetic layer 42 has the bottom surface 42c facing toward the first shield 16A.

As shown in FIG. 2, the top surface 16Ab of the first shield 16A includes a first region 16Ab1 including an end located in the medium facing surface 80, and a second region 16Ab2 that is located farther from the medium facing surface 80 than is the first region 16Ab1. The seed layer 87 is not present on the first region 16Ab1 but is present on the second region 16Ab2. The seed layer 87 is present also on the top surface of the insulating layer 62.

As shown in FIG. 2, the bottom surface 42c of the magnetic layer 42 includes a first region 42c1 in contact with the first region 16Ab1 of the top surface 16Ab of the first shield 16A and a second region 42c2 in contact with the seed layer 87. As viewed from the seed layer 87, the first shield 16A corresponds to the "first magnetic layer" according to the invention, and the magnetic layer 42 corresponds to the "second magnetic layer" according to the invention.

As has been described, the magnetic structure MS is formed to include the first magnetic layer, the second magnetic layer stacked on the first magnetic layer, and the seed layer. In the portion of the magnetic structure MS consisting of the magnetic layer 34, the second shield 16B and the seed layer 82, the first magnetic layer (the magnetic layer 34) is a component of the return path section 30, and the second magnetic layer (the second shield 16B) is a component of the write shield 16.

In the portion of the magnetic structure MS consisting of the second shield 16B, the side shields 16C and 16D and the seed layers 83 and 84, each of the first magnetic layer (the second shield 16B) and the second magnetic layer (the side shields 16C and 16D) is a component of the write shield 16.

In the portion of the magnetic structure MS consisting of the first shield 16A, the magnetic layer 42 and the seed layer 87, the first magnetic layer (the first shield 16A) is a component of the write shield 16, and the second magnetic layer (the magnetic layer 42) is a component of the return path section 40.

The first portion 20 and the second portion 10 of the coil will now be described in detail with reference to FIG. 6 to FIG. 8. FIG. 6 is a plan view showing the second portion 10. As previously mentioned, the second portion 10 is wound approximately four turns around the magnetic layer 33 which constitutes part of the second return path section 30. The second portion 10 includes four coil elements 10A, 10B, 10C, and 10D extending to pass between the magnetic layer 32 and the magnetic layer 33, in particular, within the second space S2. Note that the coil elements refer to part of the coil winding. The coil elements 10A, 10B, 10C, and 10D align in this order in the direction perpendicular to the medium facing surface 80, the coil element 10A being closest to the medium facing surface 80. The second portion 10 has a coil connection part 10E electrically connected to the first portion 20.

FIG. 7 is a plan view showing the first layer 21 of the first portion 20. As previously mentioned, the first layer 21 is wound one turn around the magnetic layer 41 which constitutes part of the first return path section 40. The first layer 21 includes a coil element 21A extending to pass between the first shield 16A and the magnetic layer 41, in particular, within the first space S1. The first layer 21 has a coil connection part 21S electrically connected to the coil connection part 10E of the second portion 10, and a coil connection part 21E electrically connected to the second layer 22. The coil connection part 21S is electrically connected to the coil connection part 10E via first to third connection layers of columnar shape (not shown) that penetrate a plurality of layers interposed between the first layer 21 and the second portion 10. The first to third connection layers are stacked in order on the coil connection part 10E. The coil connection part 21S is located on the third connection layer. The first to third connection layers are each made of a conductive material such as copper.

FIG. 8 is a plan view showing the second layer 22 of the first portion 20. As previously mentioned, the second layer 22 is wound approximately one turn around the magnetic layer 43 which constitutes part of the first return path section 40. The second layer 22 includes a coil element 22A extending to pass between the magnetic layer 42 and the magnetic layer 43, in particular, within the first space S1. The second layer 22 has a coil connection part 22S penetrating the insulating layer 62 and the insulating film 63 and electrically connected to the coil connection part 21E of the first layer 21. In the example shown in FIG. 6 to FIG. 8, the first portion 20 and the second portion 10 are connected in series.

The shape of the main pole 15 will now be described in detail with reference to FIG. 2 and FIG. 6 to FIG. 8. As shown in FIG. 6 to FIG. 8, the main pole 15 includes a track width defining portion 15A and a wide portion 15B. The track width defining portion 15A has an end face located in the medium facing surface 80, and an end opposite to the end face. The wide portion 15B is connected to the end of the track width defining portion 15A. As shown in FIG. 2, the main pole 15 has: the top surface 15T which is the surface located at the end on the front side in the direction T of travel of the recording medium; the bottom end 15L opposite to the top surface 15T; the first side part; and the second side part. The width of the top surface 15T in the track width direction TW is greater in the wide portion 15B than in the track width defining portion 15A.

In the track width defining portion 15A, the width of the top surface 15T in the track width direction TW is generally constant regardless of the distance from the medium facing surface 80. In the wide portion 15B, the width of the top surface 15T in the track width direction TW is, for example, equal to that in the track width defining portion 15A when seen at the boundary between the track width defining portion 15A and the wide portion 15B, and gradually increases with increasing distance from the medium facing surface 80, then becoming constant. Here, the length of the track width defining portion 15A in the direction perpendicular to the medium facing surface 80 will be referred to as the neck height. The neck height falls within the range of 0 to 0.3 μm, for example. A zero neck height means that no track width defining portion 15A exists and an end face of the wide portion 15B is thus located in the medium facing surface 80.

The top surface 15T includes a first portion, a second portion, a third portion, and a fourth portion that are contiguously arranged in this order, the first portion being closest to the medium facing surface 80. The first portion has a first end located in the medium facing surface 80 and a second end opposite to the first end. The second portion is connected to the second end of the first portion. The third portion has a first end connected to the second portion and a second end that is located farther from the medium facing surface 80 than is the first end. The fourth portion is connected to the second end of the third portion. The first and third portions are inclined such that their respective second ends are located on the front side in the direction T of travel of the recording medium relative to their respective first ends. The second and fourth portions extend in a direction substantially perpendicular to the medium facing surface 80.

As previously mentioned, the first shield 16A has the bottom surface 16Ac. The bottom surface 16Ac includes a portion that is opposed to the first portion of the top surface 15T with the first gap layer 19 constituting part of the gap layer 17 interposed therebetween.

The bottom end 15L includes a first portion, a second portion, a third portion, and a fourth portion that are contiguously arranged in this order, the first portion being closest to the medium facing surface 80. The first portion has a first end located in the medium facing surface 80 and a second end opposite to the first end. The second portion is connected to the second end of the first portion. The third portion has a first end connected to the second portion and a second end that is located farther from the medium facing surface 80 than is the first end. Each of the first to third portions may be an edge formed by two intersecting planes, or may be a plane connecting two planes to each other. The fourth portion is a plane connected to the second end of the third portion. The first and third portions are inclined such that their respective second ends are located on the rear side in the direction T of travel of the recording medium relative to their respective first ends. The second and fourth portions extend in a direction substantially perpendicular to the medium facing surface 80.

The end face of the main pole 15 located in the medium facing surface 80 has a first side adjacent to the first gap layer 19, a second side connected to one end of the first side, and a third side connected to the other end of the first side. The first side defines the track width. The position of an end of a record bit to be recorded on the recording medium depends on the position of the first side. The end face of the main pole 15 located in the medium facing surface 80 decreases in width in the track width direction TW with increasing distance from the first side, that is, with increasing proximity to the top surface 1a of the substrate 1. Each of the second side and the third side forms an angle of, for example, 7° to 17°, or preferably 10° to 15°, relative to the direction perpendicular to the top surface 1a of the substrate 1. The first side has a length in the range of 0.05 to 0.20 μm, for example.

The function and effects of the magnetic head according to the present embodiment will now be described. The magnetic head writes data on the recording medium by using the write head section 9 and reads data stored on the recording medium by using the read head section 8. In the write head section 9, the coil including the first portion 20 and the second portion 10 produces magnetic fields corresponding to data to be written on the recording medium. A magnetic flux corresponding to the magnetic field produced by the first portion 20 passes through the first return path section 40 and the main pole 15. A magnetic flux corresponding to the magnetic field produced by the second portion 10 passes through the second return path section 30 and the main pole 15. Consequently, the main pole 15 allows the magnetic flux corresponding to the magnetic field produced by the first portion 20 and the magnetic flux corresponding to the magnetic field produced by the second portion 10 to pass.

The first portion 20 and the second portion 10 may be connected in series or in parallel. In either case, the first portion 20 and the second portion 10 are connected such that the magnetic flux corresponding to the magnetic field produced by the first portion 20 and the magnetic flux corresponding to the magnetic field produced by the second portion 10 flow in the same direction through the main pole 15.

The main pole 15 allows the magnetic fluxes corresponding to the magnetic fields produced by the coil to pass as mentioned above, and produces a write magnetic field for writing data on the recording medium by means of the perpendicular magnetic recording system.

The write shield 16 captures a disturbance magnetic field applied to the magnetic head from the outside thereof. This makes it possible to prevent erroneous writing on the recording medium induced by the disturbance magnetic field intensively captured into the main pole 15. The write shield 16 also has the function of capturing a magnetic flux produced from the end face of the main pole 15 and spreading in directions other than the direction perpendicular to the plane of the recording medium, so as to prevent the magnetic flux from reaching the recording medium.

Furthermore, the write shield 16, the first return path section 40 and the second return path section 30 have the function of allowing a magnetic flux that has been produced from the end face of the main pole 15 and has magnetized the recording medium to flow back. More specifically, a part of the magnetic flux that has been produced from the end face of the main pole 15 and has magnetized the recording medium flows back to the main pole 15 through the write shield 16 and the first return path section 40. Another part of the magnetic flux that has been produced from the end face of the main pole 15 and has magnetized the recording medium flows back to the main pole 15 through the write shield 16 and the second return path section 30.

The write shield 16 includes the first shield 16A, the second shield 16B, and the two side shields 16C and 16D. The present embodiment thus makes it possible that, in regions on both the front side and the rear side in the direction T of travel of the recording medium relative to the end face of the main pole 15 and regions on opposite sides of the end face of the main pole 15 in the track width direction TW, a magnetic flux that is produced from the end face of the main pole 15 and spreads in directions other than the direction perpendicular to the plane of the recording medium can be captured and thereby prevented from reaching the recording medium. Consequently, the present embodiment makes it possible to prevent adjacent track erasure induced by a skew. The first and second shields 16A and 16B contribute not only to the prevention of adjacent track erasure induced by a skew but also to an increase in the gradient of the write magnetic field. The side shields 16C and 16D greatly contribute to the prevention of adjacent track erasure, in particular. According to the present embodiment, such functions of the write shield 16 serve to increase the recording density.

Furthermore, as shown in FIG. 5, the present embodiment is configured so that in the medium facing surface 80, the distance between the first and second side parts of the main pole 15 in the track width direction TW, i.e., the width of the end face of the main pole 15, decreases with increasing proximity to the top surface 1a of the substrate 1. According to the present embodiment, this feature also serves to prevent adjacent track erasure induced by a skew.

The present embodiment is also configured so that in the medium facing surface 80, the distance between the sidewall 16Cd of the side shield 16C and the sidewall 16Dd of the side shield 16D in the track width direction TW decreases with increasing proximity to the top surface 1a of the substrate 1, as does the distance between the first and second side parts of the main pole 15. The present embodiment thus allows both the distance between the first side part and the sidewall 16Cd and the distance between the second side part and the sidewall 16Dd to be small and constant in the medium facing surface 80. This configuration allows the side shields 16C and 16D to efficiently capture the magnetic flux that is produced from the end face of the main pole 15 and spreads out to opposite areas in the track width direction TW. Consequently, according to the present embodiment, it is possible to enhance the function of the side shields 16C and 16D in particular, and to thereby enable more effective prevention of adjacent track erasure induced by a skew.

The write shield 16 cannot capture much magnetic flux if the write shield 16 is not magnetically connected with any magnetic layer having a sufficiently large volume enough to accommodate the magnetic flux captured by the write shield 16. In the present embodiment, there are provided the first return path section 40 which magnetically couples the first shield 16A of the write shield 16 and the main pole 15 to each other, and the second return path section 30 which magnetically couples the second shield 16B of the write shield 16 and the main pole 15 to each other. Such a configuration allows the magnetic flux captured by the write shield 16 to flow into the main pole 15 by way of the first return path section 40 and the second return path section 30. In the present embodiment, the first return path section 40, the second return path section 30 and the main pole 15, which are magnetic layers large in volume, are magnetically connected to the write shield 16. This allows the write shield 16 to capture much magnetic flux, so that the above-described effect of the write shield 16 can be exerted effectively.

In the present embodiment, the top surface 15T of the main pole 15 includes the first and third portions that are inclined such that their respective second ends are located on the front side in the direction T of travel of the recording medium relative to their respective first ends, while the bottom end 15L of the main pole 15 includes the first and third portions that are inclined such that their respective second ends are located on the rear side in the direction T of travel of the recording medium relative to their respective first ends. This allows the main pole 15 to have a small thickness in the medium facing surface 80, thereby allowing the prevention of adjacent track erasure induced by a skew. On the other hand, since a portion of the main pole 15 away from the medium facing surface 80 can have a large thickness, it is possible for the main pole 15 to direct much magnetic flux to the medium facing surface 80, and this allows the improvement of write characteristics such as the overwrite property.

The features of the arrangement of the seed layers 82 to 84 and 87 and the effects resulting therefrom will now be described in detail. In the present embodiment, the second shield 16B is stacked on the magnetic layer 34 with the seed layer 82 interposed therebetween. The seed layer 82 may be made of a material the same as or different from the material of the magnetic layer 34 and the second shield 16B. If the seed layer 82 is made of a material different from the material of the magnetic layer 34 and the second shield 16B, the seed layer 82 should have features different from those of the magnetic layer 34 and the second shield 16B. Even if the same material is employed for the seed layer 82 as that for the magnetic layer 34 and the second shield 16B, forming the seed layer 82 by a method different from that for forming the magnetic layer 34 and the second shield 16B should make the seed layer 82 have features different from those of the magnetic layer 34 and the second shield 16B in terms of film quality, crystal grain size, crystal structure, and the like. A case will now be contemplated where the seed layer 82 having features different from those of the magnetic layer 34 and the second shield 16B is interposed between the magnetic layer 34 and the second shield 16B such that the seed layer 82 lies over the entire top surface 34b of the magnetic layer 34. In this case, in the medium facing surface 80, an end of the seed layer 82 is interposed between the front end face 34a of the magnetic layer 34 and the second end face portion 16Ba of the second shield 16B. This makes the magnetic structure MS vulnerable to magnetic field leakage from inside to outside in the vicinity of the end of the seed layer 82. As a result, adjacent track erasure may occur.

In contrast to this, in the present embodiment, the seed layer 82 is disposed away from the medium facing surface 80 so that the end of the seed layer 82 is not exposed in the medium facing surface 80. More specifically, in the present embodiment, as previously described, the top surface 34b of the magnetic layer 34 includes the first region 34b1 including an end located in the medium facing surface 80 and the second region 34b2 that is located farther from the medium facing surface 80 than is the first region 34b1. The seed layer 82 is present on the second region 34b2 and not on the first region 34b1. These features of the present embodiment make it possible to prevent the occurrence of adjacent track erasure attributable to the seed layer 82.

The above explanations also hold true for the seed layers 83, 84, and 87. In the present embodiment, the side shields 16C and 16D are each stacked on the second shield 16B with the seed layers 83 and 84 interposed between the second shield 16B and the side shields 16C and 16D. The second shield 16B has the top surface 16Bb including the first region 16Bb1 and the second region 16Bb2. The seed layers 83 and 84 are present on the second region 16Bb2 and not on the first region 16Bb1. These features of the present embodiment make it possible to prevent the occurrence of adjacent track erasure attributable to the seed layers 83 and 84.

Likewise, in the present embodiment, the magnetic layer 42 is stacked on the first shield 16A with the seed layer 87 interposed therebetween. The first shield 16A has the top surface 16Ab including the first region 16Ab1 and the second region 16Ab2. The seed layer 87 is present on the second region 16Ab2 and not on the first region 16Ab1. These features of the present embodiment make it possible to prevent the occurrence of adjacent track erasure attributable to the seed layer 87.

The seed layers 83 and 84 may be made of a material the same as or different from the material of the second shield 16B and the side shields 16C and 16D. The seed layer 87 may be made of a material the same as or different from the material of the first shield 16A and the magnetic layer 42.

A method of manufacturing the magnetic head according to the present embodiment will now be described. In the method of manufacturing the magnetic head according to the present embodiment, first, as shown in FIG. 4 and FIG. 5, the insulating layer 2, the first read shield layer 3 and the first read shield gap film 4 are formed in this order on the substrate 1. Next, the MR element 5 and not-shown leads connected to the MR element 5 are formed on the first read shield gap film 4. The MR element 5 and the leads are then covered with the second read shield gap film 6. Then, the second read shield layer 7, the nonmagnetic layer 71, the middle shield layer 72 and the nonmagnetic layer 73 are formed in this order on the second read shield gap film 6.

Then, the magnetic layer 31 is formed on the nonmagnetic layer 73 by frame plating, for example. As shown in FIG. 4, the plating film to become the magnetic layer 31 grows in the direction perpendicular to the top surface 1a of the substrate 1. Next, the insulating layer 51 is formed over the entire top surface of the stack. The insulating layer 51 is then polished by, for example, chemical mechanical polishing (hereinafter referred to as CMP), until the magnetic layer 31 is exposed. The top surfaces of the magnetic layer 31 and the insulating layer 51 are thereby made even with each other.

Then, the magnetic layers 32 and 33 are formed on the magnetic layer 31 by frame plating, for example. As shown in FIG. 4, the plating film to become the magnetic layer 32 grows in the direction perpendicular to the top surface 1a of the substrate 1. The insulating film 52 is then formed over the entire top surface of the stack. Where alumina is selected as the material of the insulating film 52, the insulating film 52 is formed by atomic layer deposition (hereinafter referred to as ALD), for example. Next, the second portion 10 of the coil is formed by frame plating, for example. The insulating layer 53 is then formed in the space between adjacent turns of the second portion 10. The second portion 10 and the insulating layer 53 are formed such that their top surfaces are higher in level than portions of the insulating film 52 that lie on the magnetic layers 32 and 33. Then, the insulating layer 54 is formed over the entire top surface of the stack. The second portion 10, the insulating film 52, and the insulating layers 53 and 54 are then polished by, for example, CMP, until the magnetic layers 32 and 33 are exposed.

Next, the insulating layer 55 is formed over the entire top surface of the stack. The insulating layer 55 is then selectively etched by, for example, ion beam etching (hereinafter referred to as IBE), so that the top surfaces of the magnetic layers 32 and 33 and the coil connection part 10E (see FIG. 6) of the second portion 10 are exposed.

Now, with reference to FIG. 9 to FIG. 15, a description will be given of a series of steps up to the step of forming the side shields 16C and 16D following the above-described step. FIG. 9 to FIG. 15 each show a stack of layers formed in the process of manufacturing the magnetic head. In FIG. 9 to FIG. 15, the symbol "ABS" indicates a position on the top surface of the uppermost layer of the stack at which the medium facing surface 80 is to be formed.

Figure 9:
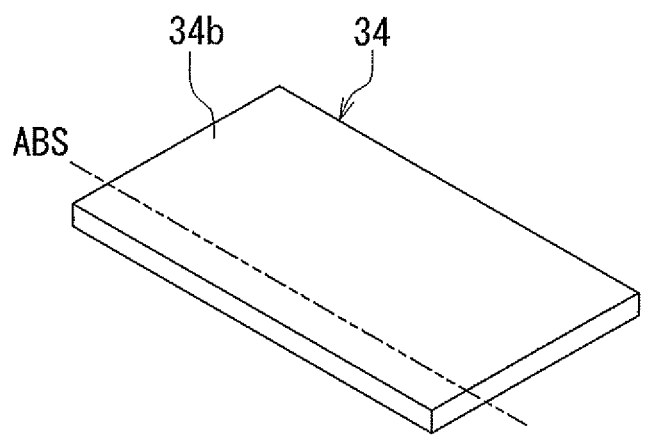
FIG. 9 is a perspective view showing the step of forming a magnetic layer of a second return path section in a method of manufacturing the magnetic head according to the first embodiment of the invention.

FIG. 9 shows the step of forming the magnetic layer 34. In this step, the magnetic layer 34 is formed over the magnetic layer 32 and the insulating layer 54, the magnetic layer 35 (see FIG. 4) is formed on the magnetic layer 33, and the not-shown first connection layer is formed on the coil connection part 10E of the second portion 10, by employing frame plating, for example. As shown in FIG. 4, the plating film to become the magnetic layer 34 grows in the direction perpendicular to the top surface 1a of the substrate 1. Next, the insulating layer 56 is formed over the entire top surface of the stack. The insulating layer 56 is then polished by, for example, CMP, until the magnetic layers 34 and 35 and the first connection layer are exposed.

Figure 10:
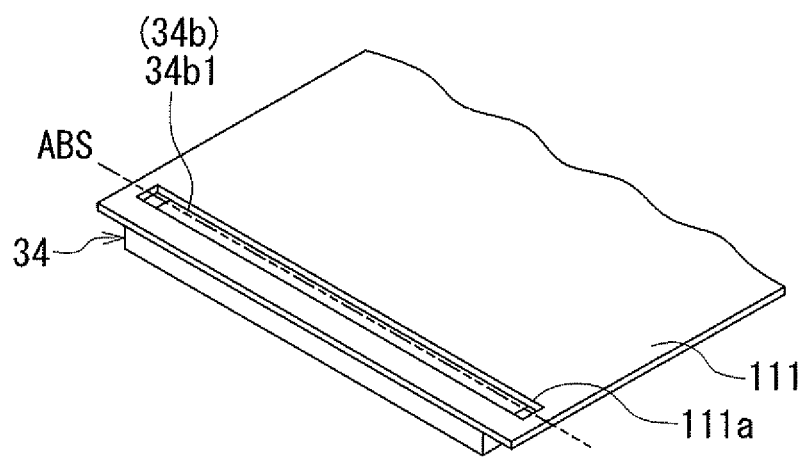
FIG. 10 is a perspective view showing a step that follows the step shown in FIG. 9.

Next, the seed layers 82 and 85 and the second shield 16B are formed on the magnetic layer 34. This step will now be described in detail. First, as shown in FIG. 10, a seed layer 111 is formed over the magnetic layers 34 and 35 and the insulating layer 56 by physical vapor deposition such as sputtering. The seed layer 111 includes the seed layers 82 and 85. Next, the seed layer 111 is selectively etched to form therein an opening 111a for exposing the first region 34b1 of the top surface 34b of the magnetic layer 34. The second region 34b2 of the top surface 34b of the magnetic layer 34 is covered with the seed layer 111.

Figure 11:
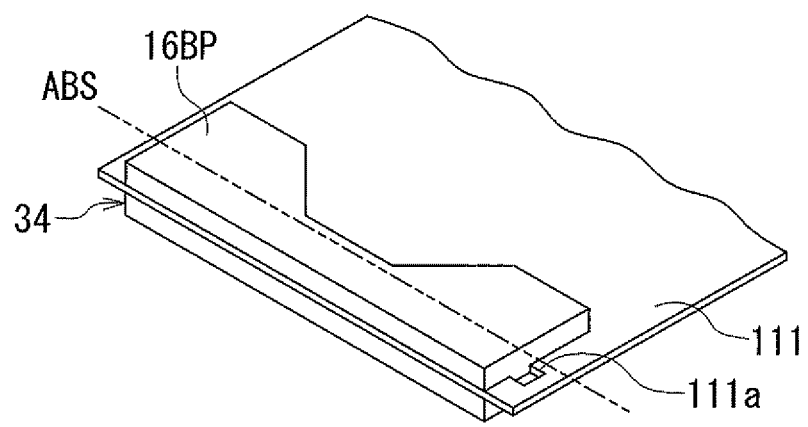
FIG. 11 is a perspective view showing a step that follows the step shown in FIG. 10.

FIG. 11 shows the next step. In this step, first, a second preliminary shield 16BP, which is to later become the second shield 16B, is formed over the seed layer 111 and the magnetic layer 34 by plating, using the seed layer 111 and the magnetic layer 34 as the seed and the cathode. More specifically, the stack shown in FIG. 10 is immersed in an electrolytic solution in which the anode is provided. Then, using the anode, and the seed layer 111 and the magnetic layer 34 serving as the cathode, the electrolytic solution is energized to form a plating film, which is to become the second preliminary shield 16BP, over the top surface of the seed layer 111 and the first region 34b1 of the top surface 34b of the magnetic layer 34. Note that in any subsequent steps, a plating method using a seed layer and a magnetic layer as the seed and the cathode and a plating method using a seed layer as the seed and the cathode are the same as the above-described method. As shown in FIG. 3 and FIG. 4, the plating film to become the second preliminary shield 16BP (the second shield 16B) grows in the direction perpendicular to the top surface 1a of the substrate 1.

Next, the magnetic layer 36 (see FIG. 4) is formed on the seed layer 111 by plating, using the seed layer 111 as the seed and the cathode. The magnetic layer 36 may be formed at the same time the second preliminary shield 16BP is formed.

Figure 12:
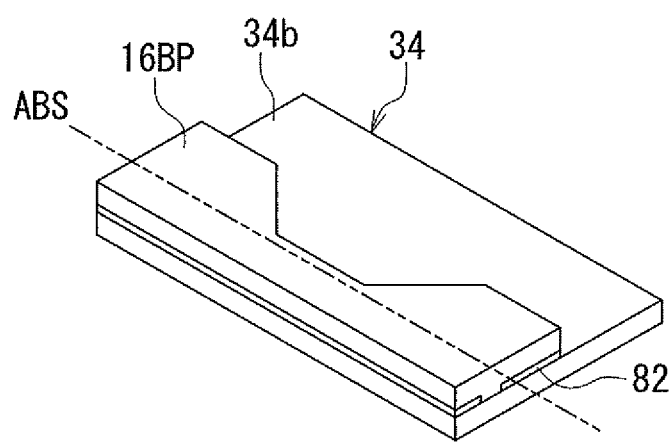
FIG. 12 is a perspective view showing a step that follows the step shown in FIG. 11.

FIG. 12 shows the next step. In this step, using the second preliminary shield 16BP and the magnetic layer 36 as an etching mask, the seed layer 111 except portions thereof lying under the second preliminary shield 16BP and the magnetic layer 36 is removed by IBE, for example. The seed layer 111 is thereby separated into the seed layer 82 and the seed layer 85 (see FIG. 4).

Next, the not-shown second connection layer is formed on the first connection layer by frame plating, for example. The nonmagnetic layer 57 is then formed over the entire top surface of the stack. Then nonmagnetic layer 57 is then polished by, for example, CMP, until the second preliminary shield 16BP, the magnetic layer 36 and the second connection layer are exposed. Next, part of the magnetic layer 36 and part of the nonmagnetic layer 57 are etched by reactive ion etching, for example. The second preliminary shield 16BP and part of the nonmagnetic layer 57 are then taper-etched by, for example, IBE so as to provide the second preliminary shield 16BP with the top surface 16Bb. This makes the second preliminary shield 16BP into the second shield 16B.

Figure 13:
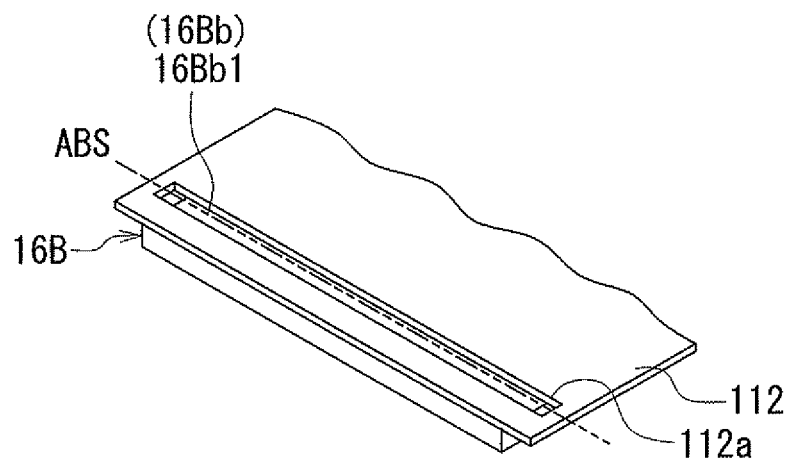
FIG. 13 is a perspective view showing a step that follows the step shown in FIG. 12.

Next, the seed layers 83 and 84 and the side shields 16C and 16D are formed on the second shield 16B. This step will now be described in detail. First, as shown in FIG. 13, a seed layer 112 is formed over the second shield 16B, the magnetic layer 36 and the nonmagnetic layer 57 by physical vapor deposition such as sputtering. The seed layer 112 includes the seed layers 83 and 84. Next, the seed layer 112 is selectively etched to form therein an opening 112a for exposing the first region 16Bb1 of the top surface 16Bb of the second shield 16B. The second region 16Bb2 of the top surface 16Bb of the second shield 16B is covered with the seed layer 112.

Figure 14:
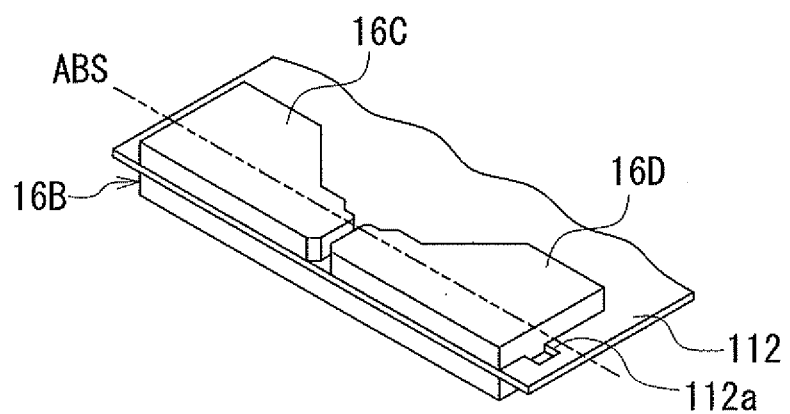
FIG. 14 is a perspective view showing a step that follows the step shown in FIG. 13.

FIG. 14 shows the next step. In this step, first, the side shields 16C and 16D are formed over the seed layer 112 and the second shield 16B by plating, using the seed layer 112 and the second shield 16B as the seed and the cathode. As shown in FIG. 3, the plating films to become the side shields 16C and 16D grow in the direction perpendicular to the top surface 1a of the substrate 1.

Figure 15:
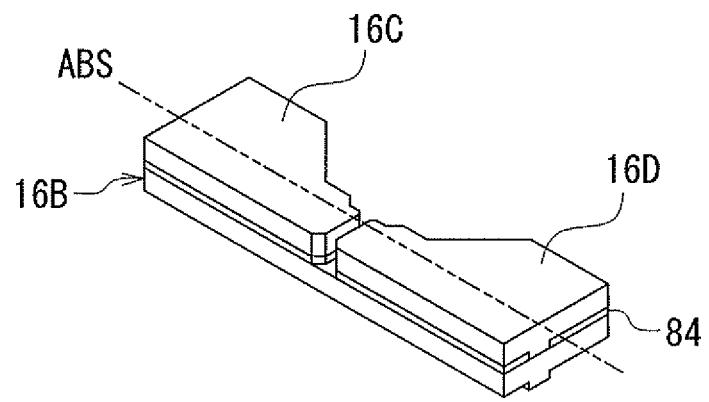
FIG. 15 is a perspective view showing a step that follows the step shown in FIG. 14.

FIG. 15 shows the next step. In this step, using the side shields 16C and 16D as an etching mask, the seed layer 112 except portions thereof lying under the side shields 16C and 16D is removed by IBE, for example. The seed layer 112 is thereby separated into the seed layer 83 (see FIG. 3 and FIG. 5) and the seed layer 84.

The steps that follow the separation into the seed layers 83 and 84 will now be described with reference to FIG. 4 and FIG. 5. First, the second gap layer 18 is formed to cover the second shield 16B and the side shields 16C and 16D. Where alumina is selected as the material of the second gap layer 18, the second gap layer 18 is formed by ALD, for example. Where Ru is selected as the material of the second gap layer 18, the second gap layer 18 is formed by chemical vapor deposition, for example.

The second gap layer 18 is then selectively etched to form therein an opening for exposing the top surface of the magnetic layer 36 and an opening for exposing the top surface of the not-shown second connection layer. Next, the main pole 15 and the not-shown third connection layer are formed by frame plating, for example. The main pole 15 and the third connection layer are formed such that their top surfaces are higher in level than portions of the second gap layer 18 that lie on the side shields 16C and 16D. Next, the not-shown first nonmagnetic layer is formed over the entire top surface of the stack. The main pole 15, the third connection layer and the first nonmagnetic layer are then polished by, for example, CMP, until the second gap layer 18 is exposed.

Then, respective portions of the main pole 15, the side shields 16C and 16D and the second gap layer 18 are etched in the vicinity of the position at which the medium facing surface 80 is to be formed. This etching is performed so that the top surface 15T of the main pole 15, which is an inclined surface, is provided with the third portion. Next, the nonmagnetic metal layer 58 and the insulating layer 59 are formed on the main pole 15. Then, respective portions of the main pole 15, the side shields 16C and 16D and the second gap layer 18 are etched by, for example, IBE, using the nonmagnetic metal layer 58 and the insulating layer 59 as an etching mask.

Where IBE is employed to etch the portions of the main pole 15, the side shields 16C and 16D and the second gap layer 18, the etching is performed such that ion beams travel in a direction at an angle of 40° to 75° relative to the direction perpendicular to the top surface 1a of the substrate 1 and that the direction of travel of the ion beams is caused to rotate as viewed in the direction perpendicular to the top surface 1a of the substrate 1. By performing IBE in such a manner, the top surface 15T is provided with the first and second portions.

Next, the first gap layer 19 is formed over the entire top surface of the stack by sputtering or chemical vapor deposition, for example. The first gap layer 19, the nonmagnetic metal layer 58, and the insulating layer 59 are then selectively etched by, for example, IBE, so as to expose part of the top surface 15T of the main pole 15, part of the top surface 16Cb of the side shield 16C, part of the top surface 16Db of the side shield 16D, and the top surface of the third connection layer.

Next, a seed layer including the seed layers 81 and 86 is formed over the main pole 15, the side shields 16C and 16D and the first gap layer 19 by physical vapor deposition such as sputtering. Using this seed layer as the seed and the cathode, the first shield 16A and the magnetic layer 41 are then formed on the seed layer by plating. As shown in FIG. 4, the plating film to become the first shield 16A grows in the direction perpendicular to the top surface 1a of the substrate 1. Next, using the first shield 16A and the magnetic layer 41 as an etching mask, the aforementioned seed layer except portions thereof lying under the first shield 16A and the magnetic layer 41 is removed by IBE, for example. The aforementioned seed layer is thereby separated into the seed layers 81 and 86.

Next, the insulating film 61 is formed over the entire top surface of the stack. Where alumina is selected as the material of the insulating film 61, the insulating film 61 is formed by ALD, for example. The insulating film 61 is then selectively etched by, for example, IBE, so that the top surface of the third connection layer is exposed. The first layer 21 of the first portion 20 of the coil is then formed by frame plating, for example. The first layer 21 is formed such that its top surface is higher in level than portions of the insulating film 61 that lie on the first shield 16A and the magnetic layer 41. Next, the not-shown second nonmagnetic layer is formed over the entire top surface of the stack. The first layer 21, the insulating film 61 and the second nonmagnetic layer are then polished by, for example, CMP, until the first shield 16A and the magnetic layer 41 are exposed. Then, the insulating layer 62 is formed over the first layer 21 and the insulating film 61.

Figure 16:
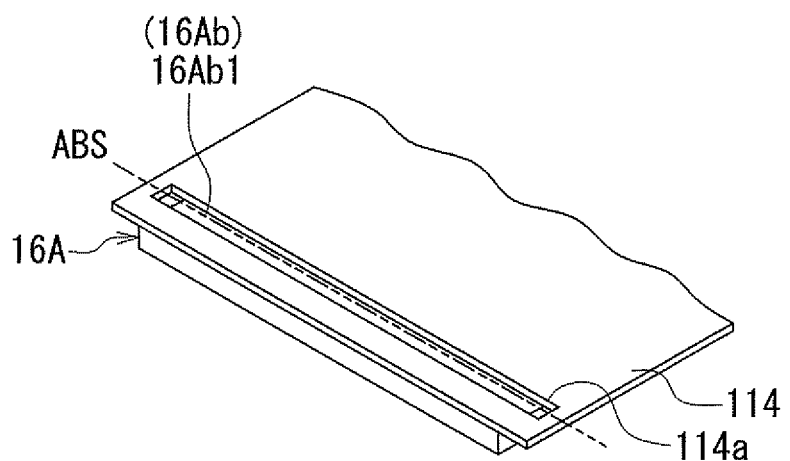
FIG. 16 is a perspective view showing the step of forming a seed layer for use for the sake of a magnetic layer of a first return path section in the method of manufacturing the magnetic head according to the first embodiment of the invention.
Figure 17:
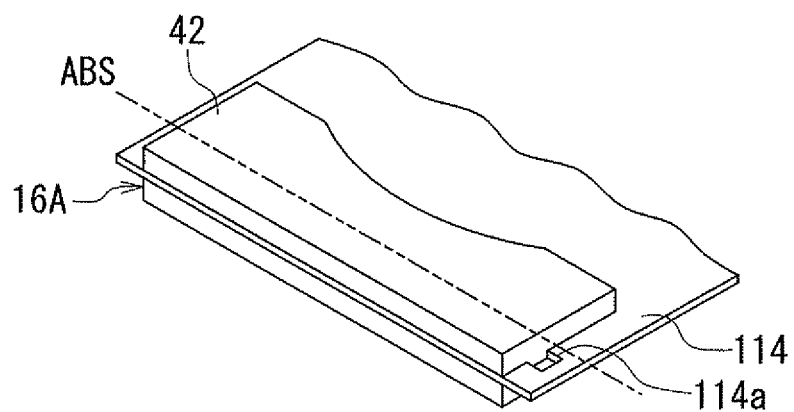
FIG. 17 is a perspective view showing a step that follows the step shown in FIG. 16.
Figure 18:
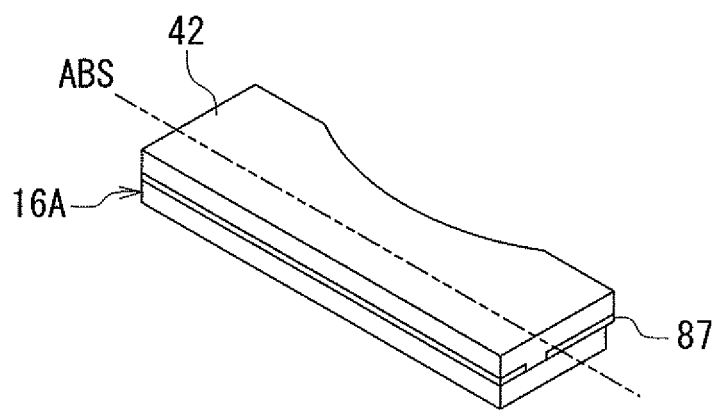
FIG. 18 is a perspective view showing a step that follows the step shown in FIG. 17.

Next, the seed layer 87 and the magnetic layer 42 are formed on the first shield 16A. This step will now be described in detail with reference to FIG. 16 to FIG. 18. FIG. 16 to FIG. 18 each show a stack of layers formed in the process of manufacturing the magnetic head. In FIG. 16 to FIG. 18, the symbol "ABS" indicates a position on the top surface of the uppermost layer of the stack at which the medium facing surface 80 is to be formed.

FIG. 16 shows the step of forming a seed layer for use for the sake of the magnetic layer 42. In this step, first, a seed layer 114 is formed over the first shield 16A, the magnetic layer 41 and the insulating layer 62 by physical vapor deposition such as sputtering. The seed layer 114 includes the seed layers 87 and 88. Next, the seed layer 114 is selectively etched to form therein an opening 114a for exposing the first region 16Ab1 of the top surface 16Ab of the first shield 16A. The second region 16Ab2 of the top surface 16Ab of the first shield 16A is covered with the seed layer 114.

FIG. 17 shows the next step. In this step, the magnetic layer 42 is formed over the seed layer 114 and the first shield 16A by plating, using the seed layer 114 and the first shield 16A as the seed and the cathode. As shown in FIG. 4, the plating film to become the magnetic layer 42 grows in the direction perpendicular to the top surface 1a of the substrate 1. The magnetic layer 43 (see FIG. 4) is also formed on the seed layer 114 by plating, using the seed layer 114 as the seed and the cathode.

FIG. 18 shows the next step. In this step, using the magnetic layers 42 and 43 as an etching mask, the seed layer 114 except portions thereof lying under the magnetic layers 42 and 43 is removed by IBE, for example. The seed layer 114 is thereby separated into the seed layer 87 and the seed layer 88 (see FIG. 4).

The steps that follow the separation into the seed layers 87 and 88 will now be described with reference to FIG. 4 and FIG. 5. First, the insulating film 63 is formed over the entire top surface of the stack. The insulating layer 62 and the insulating film 63 are then selectively etched by, for example, IBE, so that the coil connection part 21E (see FIG. 7) of the first layer 21 is exposed. Next, the second layer 22 of the first portion 20 of the coil is formed by frame plating, for example. The second layer 22 is formed such that its top surface is higher in level than portions of the insulating film 63 that lie on the magnetic layers 42 and 43. Next, a not-shown insulating layer is formed over the entire top surface of the stack. The second layer 22, the insulating film 63, and the not-shown insulating layer are then polished by, for example, CMP, until the magnetic layers 42 and 43 are exposed.

Next, the insulating layer 64 is formed over the second layer 22 and the insulating film 63. The seed layer 89 is then formed over the magnetic layers 42 and 43 and the insulating layer 64 by physical vapor deposition such as sputtering. Then, the magnetic layer 44 is formed on the seed layer 89 by plating, using the seed layer 89 as the seed and the cathode. As shown in FIG. 4, the plating film to become the magnetic layer 44 grows in the direction perpendicular to the top surface 1a of the substrate 1. Using the magnetic layer 44 as an etching mask, the seed layer 89 except a portion thereof lying under the magnetic layer 44 is removed by IBE, for example.

Next, a not-shown photoresist mask is formed on the top surface of the stack. This photoresist mask is formed by patterning a photoresist layer. This photoresist mask is not present at the position at which the medium facing surface 80 is to be formed, but is present on a portion of the stack that is to remain as the magnetic head, and covers part of the magnetic layer 44. The photoresist mask has an end closest to the position at which the medium facing surface 80 is to be formed. The distance from this end to the position at which the medium facing surface 80 is to be formed falls within the range of 0.2 to 0.5 μm, for example.

Using the photoresist mask as an etching mask, respective portions of the magnetic layers 42 and 44 and the seed layer 89 are then etched by, for example, IBE so that the magnetic layer 42 is provided with the first and second connecting surfaces. The photoresist mask is then removed.

Next, the protective layer 70 is formed to cover the entire top surface of the stack. Wiring, terminals and other components are then formed on the protective layer 70, and the substrate 1 is cut near the position ABS at which the medium facing surface 80 is to be formed. The cut surface is polished into the medium facing surface 80, and then fabrication of flying rails and other processes are performed to complete the magnetic head.

As has been described, the method of manufacturing the magnetic head according to the present embodiment includes the steps of: forming the first portion 20 and the second portion 10 of the coil; forming the main pole 15; forming the magnetic structure MS; and forming the first gap layer 19 and the second gap layer 18 which constitute the gap part 17. The step of forming the magnetic structure MS includes the steps of: forming the first shield 16A; forming the second shield 16B; forming the side shields 16C and 16D; forming the magnetic layer 34; forming the magnetic layer 42; forming the seed layer 111 including the seed layer 82; forming the seed layer 112 including the seed layers 83 and 84; and forming the seed layer 114 including the seed layer 87.

In the present embodiment, the second shield 16B (the second preliminary shield 16BP) is formed using the seed layer 111 (the seed layer 82) and the magnetic layer 34 as the seed and the cathode. The seed layer 111 has the opening 111a which exposes the first region 34b1 of the top surface 34b of the magnetic layer 34. According to the present embodiment, this makes it possible to form the magnetic layer 34, the second shield 16B, and the seed layer 82 in the above-described positional relationship with each other.

In the present embodiment, the seed layer 111 (the seed layer 82) and the magnetic layer 34 are used as the seed and the cathode. This makes it possible that the plating film to become a portion of the second shield 16B that is to be formed on the seed layer 111 (the seed layer 82) and the plating film to become another portion of the second shield 16B that is to be formed on the magnetic layer 34 grow in the same direction. According to the present embodiment, it is thus possible to form the second shield 16B to be uniform.

Likewise, in the present embodiment, the side shields 16C and 16D are formed using the seed layer 112 (the seed layers 83 and 84) and the second shield 16B as the seed and the cathode. The seed layer 112 has the opening 112a which exposes the first region 16Bb1 of the top surface 16Bb of the second shield 16B. According to the present embodiment, this makes it possible to form the second shield 16B, the side shields 16C and 16D, and the seed layers 83 and 84 in the above-described positional relationship with each other. The present embodiment also makes it possible to form the side shields 16C and 16D to be uniform.

Likewise, in the present embodiment, the magnetic layer 42 is formed using the seed layer 114 (the seed layer 87) and the first shield 16A as the seed and the cathode. The seed layer 114 has the opening 114a which exposes the first region 16Ab1 of the top surface 16Ab of the first shield 16A. According to the present embodiment, this makes it possible to form the first shield 16A, the magnetic layer 42, and the seed layer 87 in the above-described positional relationship with each other. The present embodiment also makes it possible to form the magnetic layer 42 to be uniform.

Second Embodiment

Figure 19:
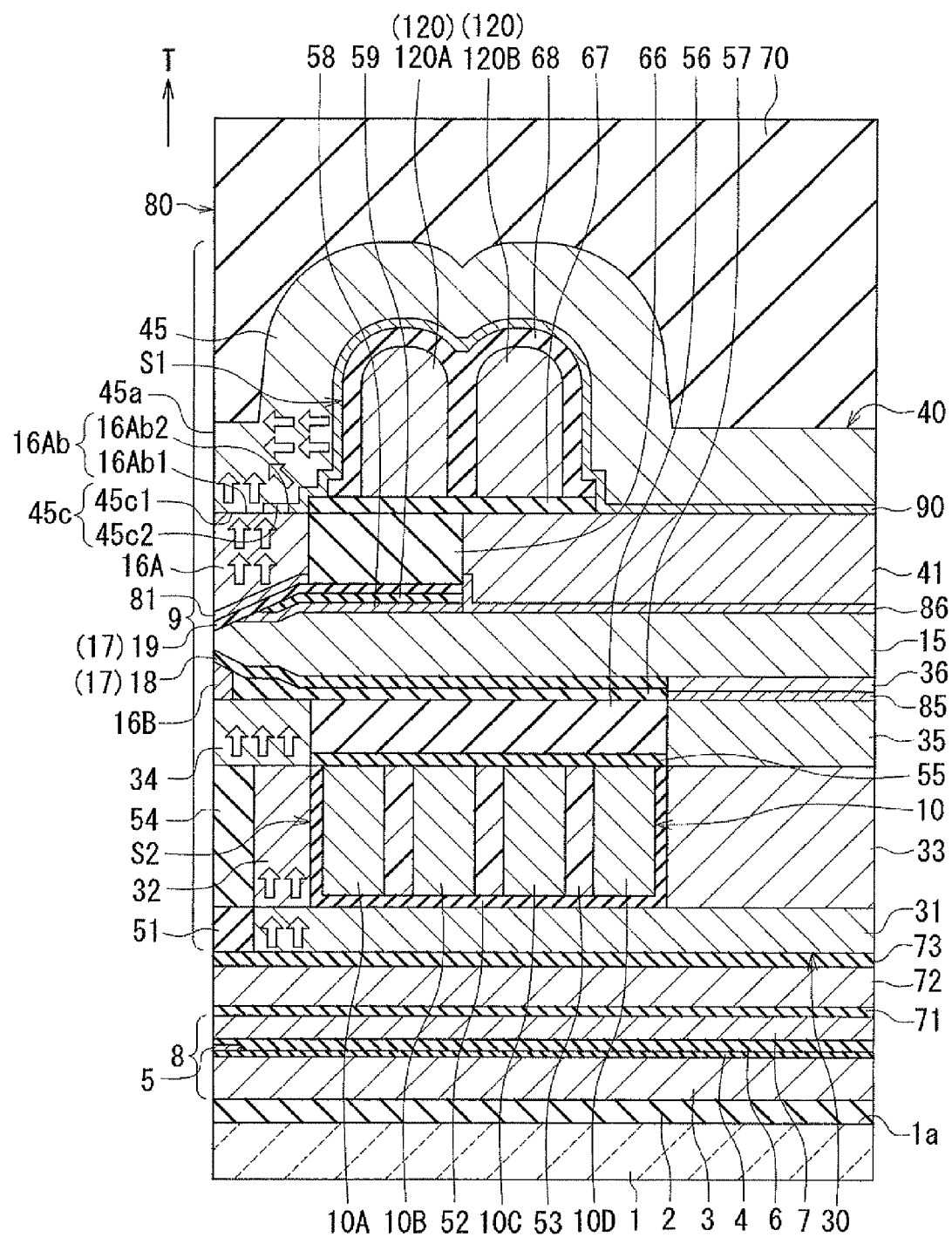
FIG. 19 is a cross-sectional view of a magnetic head according to a second embodiment of the invention.
Figure 20:
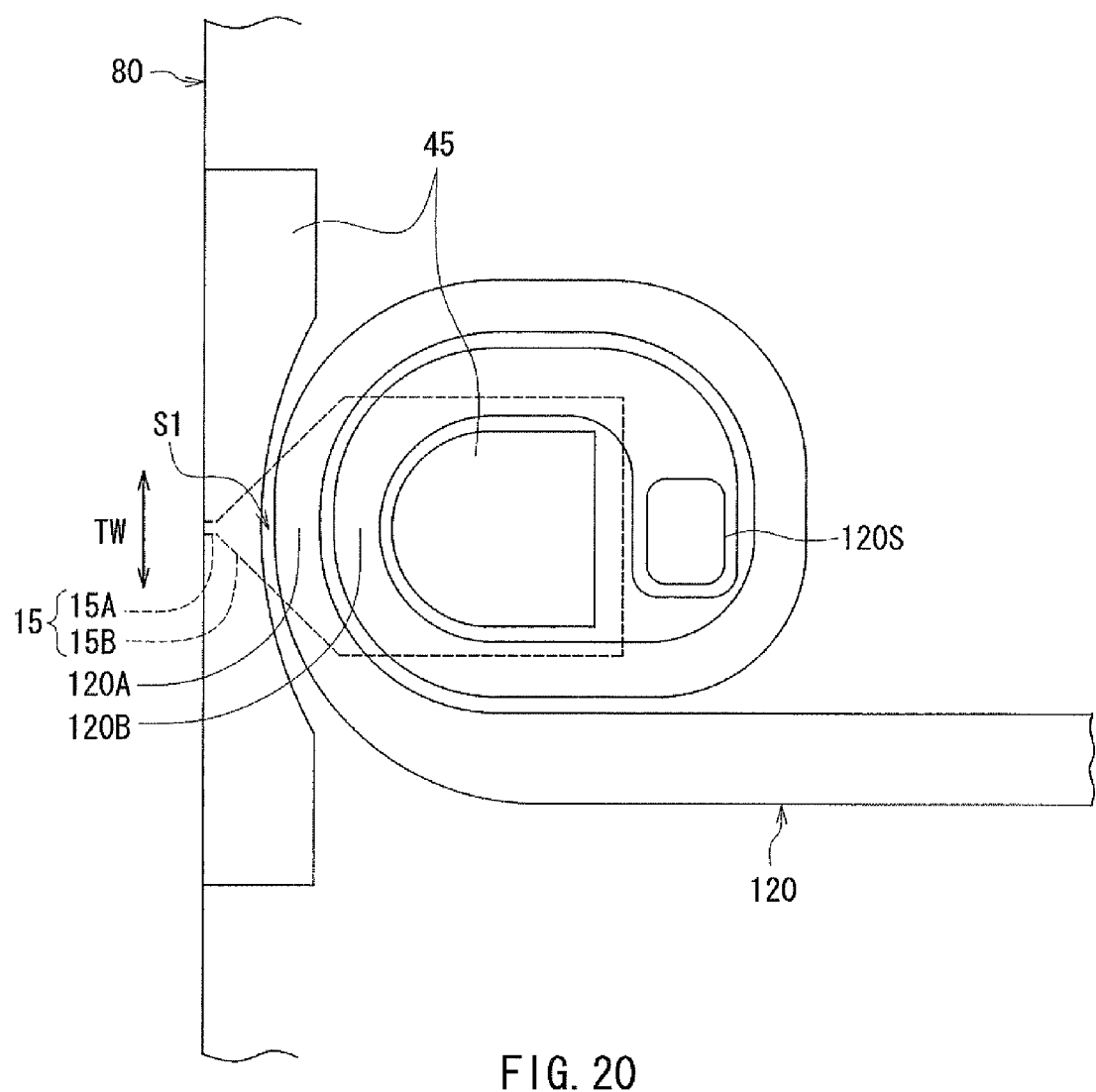
FIG. 20 is a plan view showing a first portion of a coil of the magnetic head according to the second embodiment of the invention.

A magnetic head according to a second embodiment of the invention will now be described with reference to FIG. 19 and FIG. 20. FIG. 19 is a cross-sectional view of the magnetic head according to the present embodiment. Note that FIG. 19 shows a cross section perpendicular to the medium facing surface and to the top surface of the substrate, or the main cross section, in particular. In FIG. 19, the second nonmagnetic layer mentioned in the description of the first embodiment is shown with reference numeral 66. FIG. 20 is a plan view showing a first portion of the coil of the magnetic head according to the present embodiment.

The configuration of the magnetic head according to the present embodiment is different from that of the magnetic head according to the first embodiment in the following respects. The magnetic head according to the present embodiment is without the insulating films 61 and 63, the insulating layers 62 and 64, and the seed layers 87, 88 and 89. Furthermore, the first return path section 40 of the present embodiment has a magnetic layer 45 having conductivity, in place of the magnetic layers 42 to 44 of the first embodiment. The magnetic layer 45 magnetically connects the first shield 16A and the magnetic layer 41 to each other. The magnetic layer 45 has a front end face 45a located in the medium facing surface 80 and a bottom surface 45c facing toward the first shield 16A.

The coil of the present embodiment includes a first portion 120 in place of the first portion 20 of the first embodiment. As shown in FIG. 20, the first portion 120 is wound approximately two turns around a portion of the magnetic layer 45 constituting part of the first return path section 40, the portion of the magnetic layer 45 being located on the magnetic layer 41.

The magnetic head according to the present embodiment includes an insulating layer 67 made of an insulating material and disposed on part of the top surfaces of the magnetic layer 41 and the second nonmagnetic layer 66. The first portion 120 lies on the insulating layer 67. The magnetic head further includes an insulating layer 68 made of an insulating material and disposed to cover the first portion 120. The insulating layers 67 and 68 are made of alumina, for example.

The first return path section 40 of the present embodiment further includes a seed layer 90 having conductivity. The seed layer 90 is interposed in part between the first shield 16A and the magnetic layer 45 and also interposed between the magnetic layer 45 and each of the magnetic layer 41 and the insulating layers 67 and 68. As will be described in detail later, the seed layer 90 is used in forming the magnetic layer 45 by plating.

Now, the first portion 120 will be described in more detail with reference to FIG. 20. As shown in FIG. 20, the first portion 120 includes two first coil elements 120A and 120B extending to pass between a portion of the magnetic layer 45 located on the first shield 16A and a portion of the magnetic layer 45 located on the magnetic layer 41, in particular, within the first space S1. The coil elements 120A and 120B align in this order in the direction perpendicular to the medium facing surface 80, the coil element 120A being closer to the medium facing surface 80. The first portion 120 has a coil connection part 120S electrically connected to the coil connection part 10E of the second portion 10 of the first embodiment shown in FIG. 6. The coil connection part 120S is electrically connected to the coil connection part 10E via the first to third connection layers mentioned in the description of the first embodiment and a fourth connection layer (not shown) of columnar shape disposed on the third connection layer. The coil connection part 120S is disposed on the fourth connection layer. The fourth connection layer is made of a conductive material such as copper.

Now, with reference to FIG. 19, a description will be given of a portion of the magnetic structure MS that consists of the first shield 16A, the magnetic layer 45, and the seed layer 90. The magnetic structure MS of the present embodiment is formed to include the first shield 16A, the magnetic layer 45 stacked on the first shield 16A, and the seed layer 90. The first shield 16A has the top surface 16Ab facing toward the magnetic layer 45. The magnetic layer 45 has the bottom surface 45c facing toward the first shield 16A.

As has been described in relation to the first embodiment, the top surface 16Ab of the first shield 16A includes the first region 16Ab1 including the end located in the medium facing surface 80, and the second region 16Ab2 that is located farther from the medium facing surface 80 than is the first region 16Ab1. The seed layer 90 is not present on the first region 16Ab1 but is present on the second region 16Ab2. The seed layer 90 is present also on the top surfaces of the insulating layers 67 and 68 and the magnetic layer 41.

As shown in FIG. 19, the bottom surface 45c of the magnetic layer 45 includes a first region 45c1 in contact with the first region 16Ab1 of the top surface 16Ab of the first shield 16A and a second region 45c2 in contact with the seed layer 90. As viewed from the seed layer 90, the first shield 16A corresponds to the "first magnetic layer" according to the invention, and the magnetic layer 45 corresponds to the "second magnetic layer" according to the invention.

In the present embodiment, the magnetic layer 45 is stacked on the first shield 16A with the seed layer 90 interposed therebetween. The seed layer 90 is not present on the first region 16Ab1 but is present on the second region 16Ab2. More specifically, the seed layer 90 is located away from the medium facing surface 80, so that the end of the seed layer 90 is not exposed in the medium facing surface 80. These features of the present embodiment make it possible to prevent the occurrence of adjacent track erasure attributable to the seed layer 90. The seed layer 90 may be made of a material the same as or different from the material of the first shield 16A and the magnetic layer 45.

A method of manufacturing the magnetic head according to the present embodiment will now be described with reference to FIG. 19. The method of manufacturing the magnetic head according to the present embodiment is the same as the method according to the first embodiment up to the step of forming the first shield 16A and the magnetic layer 41. In the present embodiment, the not-shown fourth connection layer is then formed on the third connection layer by frame plating, for example. Next, the second nonmagnetic layer 66 is formed over the entire top surface of the stack. The second nonmagnetic layer 66 is then polished by, for example, CMP, until the first shield 16A, the magnetic layer 41 and the fourth connection layer are exposed.

Next, the insulating layer 67 is formed over the entire top surface of the stack. The insulating layer 67 is then selectively etched by, for example, IBE, so that the top surface 16Ab of the first shield 16A, part of the top surface of the magnetic layer 41, and the top surface of the fourth connection layer are exposed. Next, the first portion 120 of the coil is formed by frame plating, for example. The insulating layer 68 is then formed to cover the first portion 120.

Next, the seed layer 90 is formed over the first shield 16A, the magnetic layer 41 and the insulating layers 67 and 68 by physical vapor deposition such as sputtering. The seed layer 90 is then selectively etched to form therein an opening for exposing the first region 16Ab1 of the top surface 16Ab of the first shield 16A. The second region 16Ab2 of the top surface 16Ab of the first shield 16A is covered with the seed layer 90. Next, the magnetic layer 45 is formed over the seed layer 90 and the first shield 16A by plating, using the seed layer 90 and the first shield 16A as the seed and the cathode. Using the magnetic layer 45 as an etching mask, the seed layer 90 except a portion thereof lying under the magnetic layer 45 is then removed by IBE, for example. Next, the protective layer 70 is formed to cover the entire top surface of the stack. The subsequent steps are the same as those in the first embodiment.

In the present embodiment, the magnetic layer 45 is formed using the seed layer 90 and the first shield 16A as the seed and the cathode. The seed layer 90 has the opening for exposing the first region 16Ab1 of the top surface 16Ab of the first shield 16A. According to the present embodiment, this makes it possible to form the first shield 16A, the magnetic layer 45, and the seed layer 90 in the above-described positional relationship with each other.

The remainder of configuration, function and effects of the present embodiment are similar to those of the first embodiment.

Third Embodiment

Figure 21:
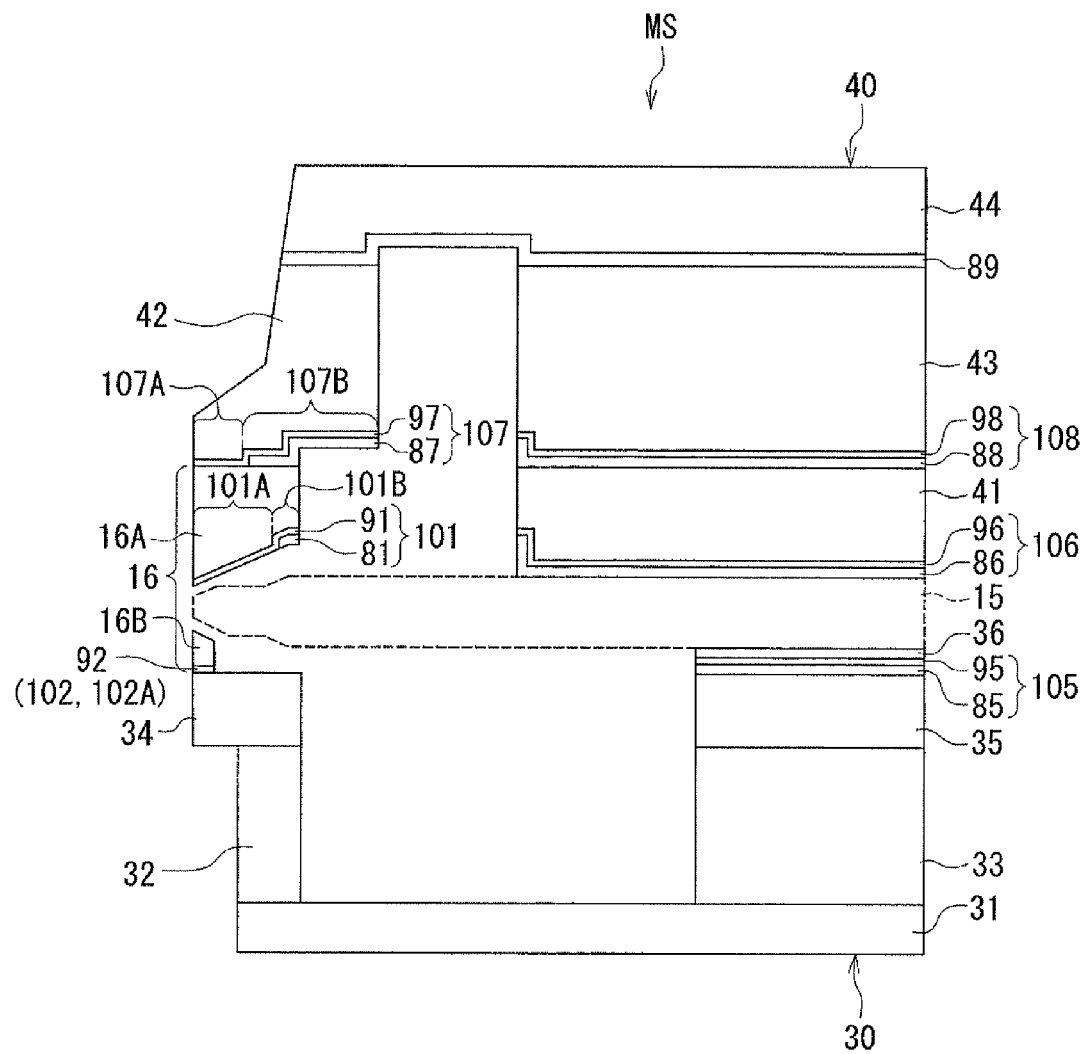
FIG. 21 is a cross-sectional view showing a magnetic structure in a magnetic head according to a third embodiment of the invention.
Figure 22:
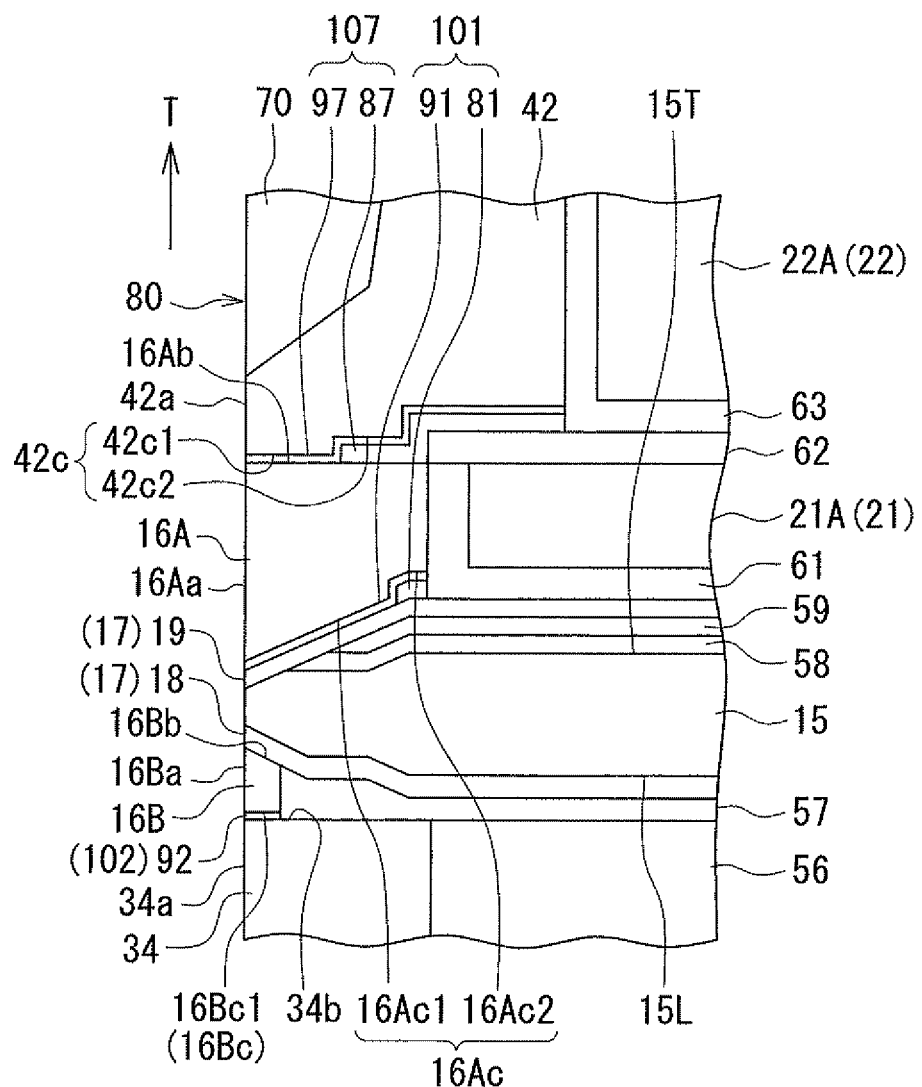
FIG. 22 is a cross-sectional view showing the main part of the magnetic head according to the third embodiment of the invention.
Figure 23:
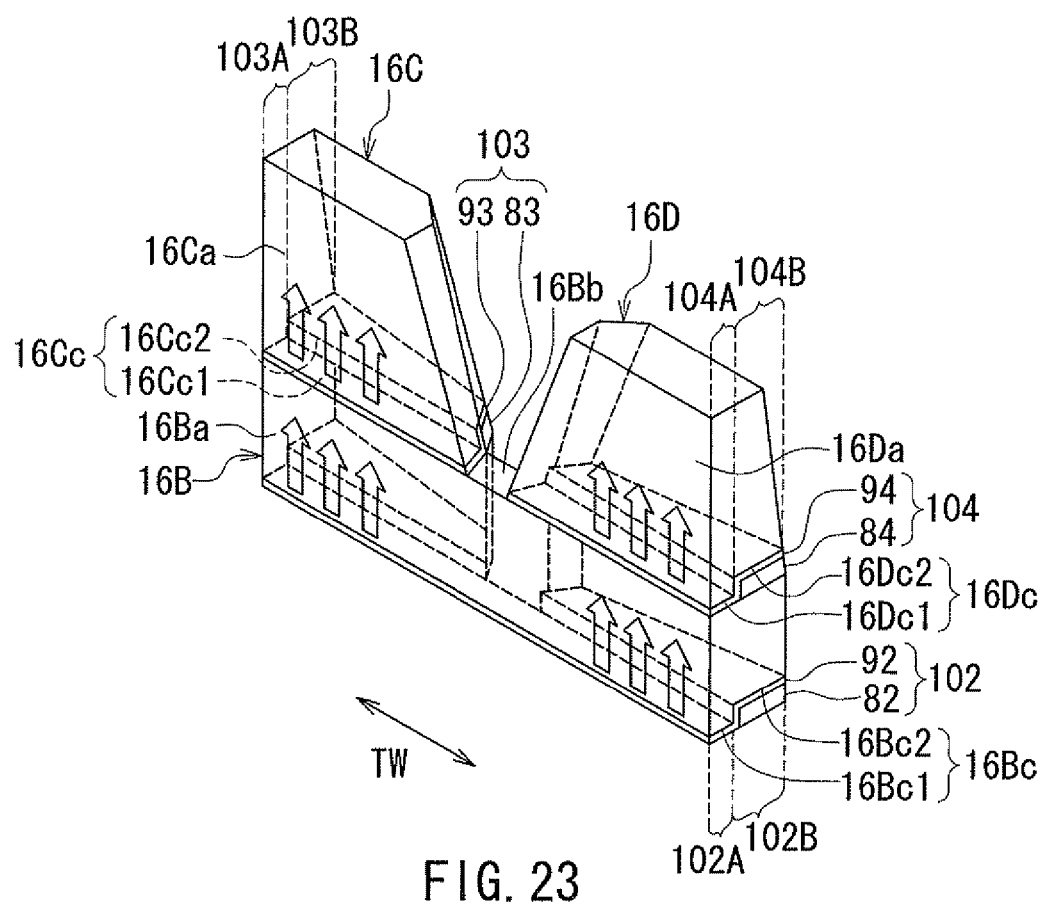
FIG. 23 is a perspective view showing a second shield and two side shields of the magnetic head according to the third embodiment of the invention.
Figure 24:
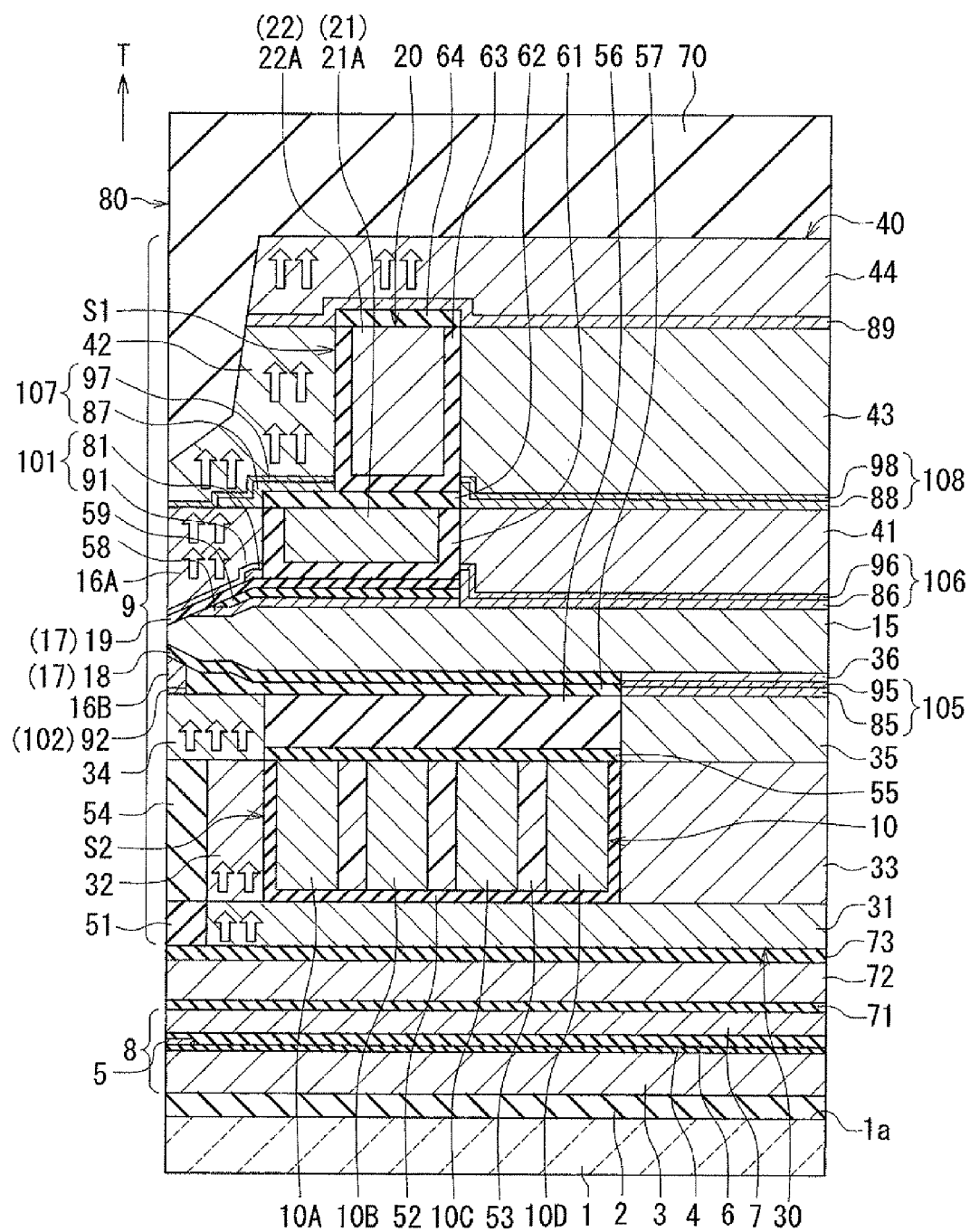
FIG. 24 is a cross-sectional view of the magnetic head according to the third embodiment of the invention.
Figure 25:
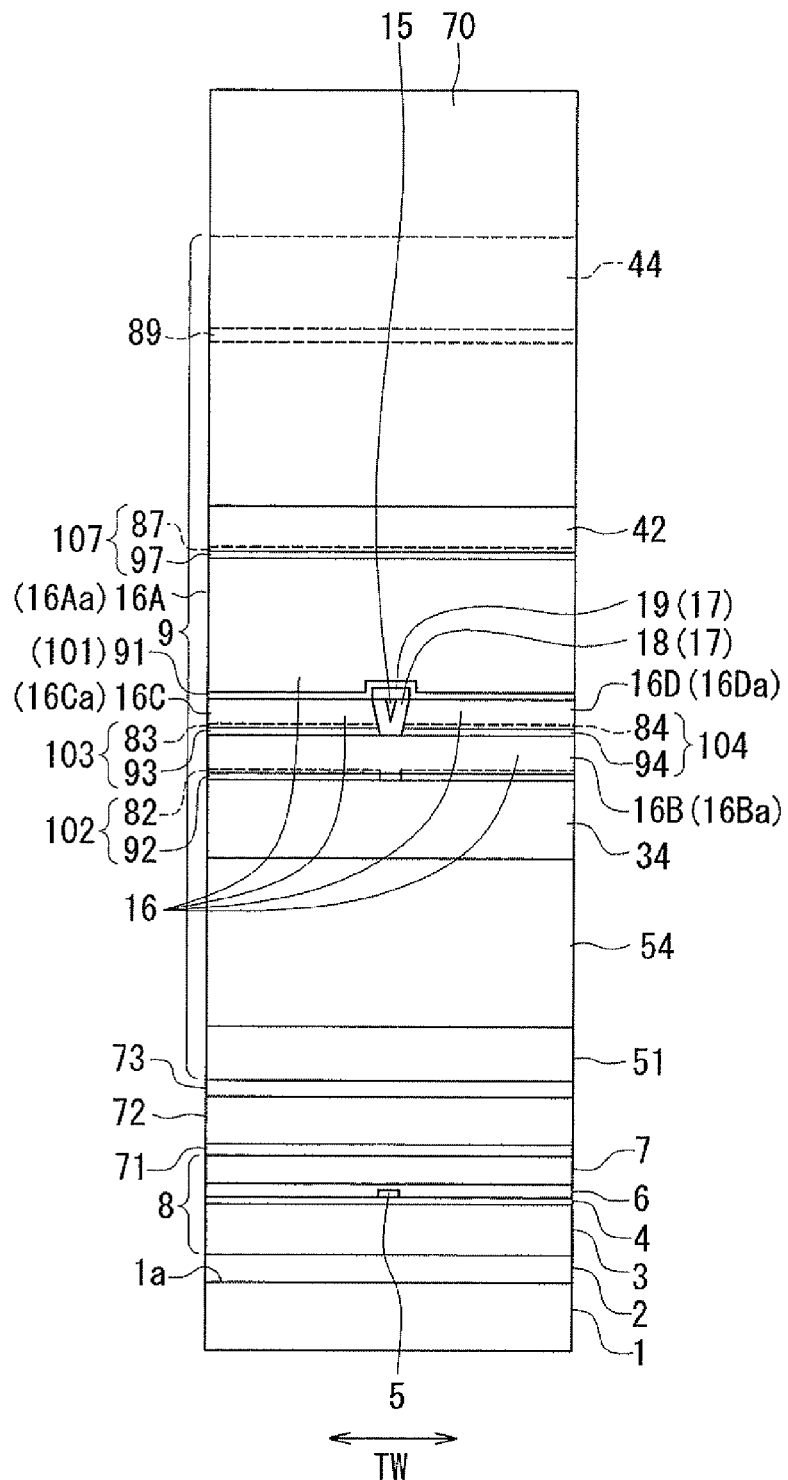
FIG. 25 is a front view showing the medium facing surface of the magnetic head according to the third embodiment of the invention.

A magnetic head according to a third embodiment of the invention will now be described with reference to FIG. 21 to FIG. 25. FIG. 21 is a cross-sectional view showing the magnetic structure in the magnetic head according to the present embodiment. FIG. 22 is a cross-sectional view showing the main part of the magnetic head according to the present embodiment. FIG. 23 is a perspective view showing the second shield and the two side shields of the magnetic head according to the present embodiment. FIG. 24 is a cross-sectional view of the magnetic head according to the present embodiment. FIG. 25 is a front view showing the medium facing surface of the magnetic head according to the present embodiment. Note that FIG. 21, FIG. 22, and FIG. 24 each show a cross section perpendicular to the medium facing surface and to the top surface of the substrate, or the main cross section, in particular.

The configuration of the magnetic head according to the present embodiment is different from that of the magnetic head according to the first embodiment in the following respects. The seed layer 81 of the present embodiment is located away from the medium facing surface 80 and lies on the side shields 16C and 16D and the first gap layer 19. The write shield 16 of the present embodiment includes seed layers 91, 92, 93, and 94 that have conductivity. The seed layer 91 is interposed between the first shield 16A and each of the side shields 16C and 16D and the first gap layer 19. The seed layer 92 is interposed between the second shield 16B and each of the magnetic layer 34 and the seed layer 82. The seed layer 93 is interposed between the side shield 16C and each of the second shield 16B and the seed layer 83. The seed layer 94 is interposed between the side shield 16D and each of the second shield 16B and the seed layer 84. Hereinafter, the combination of the seed layers 81 and 91 will be referred to as a seed layer 101, the combination of the seed layers 82 and 92 as a seed layer 102, the combination of the seed layers 83 and 93 as a seed layer 103, and the combination of the seed layers 84 and 94 as a seed layer 104. As will be described in detail later, the seed layers 101, 102, 103, and 104 are used in forming the shields 16A, 16B, 16C, and 16D, respectively, by plating.

The first return path section 40 of the present embodiment includes seed layers 96, 97, and 98 that have conductivity. The seed layer 96 is interposed between the seed layer 86 and the magnetic layer 41. The seed layer 97 is interposed between the magnetic layer 42 and each of the first shield 16A and the seed layer 87. The seed layer 98 is interposed between the seed layer 88 and the magnetic layer 43. Hereinafter, the combination of the seed layers 86 and 96 will be referred to as a seed layer 106, the combination of the seed layers 87 and 97 as a seed layer 107, and the combination of the seed layers 88 and 98 as a seed layer 108. As will be described in detail later, the seed layers 106, 107, and 108 are used in forming the magnetic layers 41, 42, and 43, respectively, by plating.

The second return path section 30 of the present embodiment includes a seed layer 95 that has conductivity. The seed layer 95 is interposed between the seed layer 85 and the magnetic layer 36. Hereinafter, the combination of the seed layers 85 and 95 will be referred to as a seed layer 105. As will be described in detail later, the seed layer 105 is used in forming the magnetic layer 36 by plating.

The seed layers 101 to 104 and 107 will now be described in more detail. Each of the seed layers 101 to 104 and 107 includes a first portion and a second portion. The second portion is located away from the medium facing surface 80. The first portion is located between the second portion and the medium facing surface 80. Hereinafter, the respective first portions of the seed layers 101, 102, 103, 104, and 107 will be represented by the symbols 101A, 102A, 103A, 104A, and 107A, respectively, and the respective second portions of the seed layers 101, 102, 103, 104, and 107 will be represented by the symbols 101B, 102B, 103B, 104B, and 107B, respectively.

A portion of the seed layer 91 that is closer to the medium facing surface 80 than is the seed layer 81 constitutes the first portion 101A of the seed layer 101, and the other portion of the seed layer 91 constitutes the second portion 101B in conjunction with the seed layer 81. The first portion 101A is smaller than the second portion 101B in thickness. In the present embodiment, the bottom surface 16Ac of the first shield 16A includes a first region 16Ac1 in contact with the first portion 101A and a second region 16Ac2 in contact with the second portion 101B.

A portion of the seed layer 92 that is closer to the medium facing surface 80 than is the seed layer 82 constitutes the first portion 102A of the seed layer 102, and the other portion of the seed layer 92 constitutes the second portion 102B in conjunction with the seed layer 82. The first portion 102A is smaller than the second portion 102B in thickness. The first region 16Bc1 of the bottom surface 16Bc of the second shield 16B is in contact with the first portion 102A, and the second region 16Bc2 is in contact with the second portion 102B.

A portion of the seed layer 93 that is closer to the medium facing surface 80 than is the seed layer 83 constitutes the first portion 103A of the seed layer 103, and the other portion of the seed layer 93 constitutes the second portion 103B in conjunction with the seed layer 83. The first portion 103A is smaller than the second portion 103B in thickness. The first region 16Cc1 of the bottom surface 16Cc of the side shield 16C is in contact with the first portion 103A, and the second region 16Cc2 is in contact with the second portion 103B.

A portion of the seed layer 94 that is closer to the medium facing surface 80 than is the seed layer 84 constitutes the first portion 104A of the seed layer 104, and the other portion of the seed layer 94 constitutes the second portion 104B in conjunction with the seed layer 84. The first portion 104A is smaller than the second portion 104B in thickness. The first region 16Dc1 of the bottom surface 16Dc of the side shield 16D is in contact with the first portion 104A, and the second region 16Dc2 is in contact with the second portion 104B.

A portion of the seed layer 97 that is closer to the medium facing surface 80 than is the seed layer 87 constitutes the first portion 107A of the seed layer 107, and the other portion of the seed layer 97 constitutes the second portion 107B in conjunction with the seed layer 87. The first portion 107A is smaller than the second portion 107B in thickness. The first region $42c1$ of the bottom surface $42c$ of the magnetic layer 42 is in contact with the first portion 107A, and the second region $42c2$ is in contact with the second portion 107B.

The thicknesses of the first portions 101A to 104A and 107A are equal to those of the seed layers 91 to 94 and 97, respectively. The thicknesses of the seed layers 91 to 94 and 97 are preferably in the range of 1 to 10 nm, and more preferably in the range of 3 to 6 nm.

The effects of the present embodiment will now be described. In the present embodiment, the seed layer 101 is present below the entire bottom surface 16Ac of the first shield 16A. In the medium facing surface 80, the first end face portion 16Aa of the first shield 16A and an end of the seed layer 101 are adjacent to each other. In this case, if the seed layer 101 is relatively large in thickness, magnetic field leakage from the inside to the outside of the magnetic structure MS tends to occur in the vicinity of the boundary between the first end face portion 16Aa of the first shield 16A and the end of the seed layer 101. This may result in the occurrence of adjacent track erasure.

In contrast to this, in the present embodiment, the seed layer 101 is formed to be small in thickness in the vicinity of the medium facing surface 80. More specifically, in the present embodiment, the seed layer 101 includes the first portion 101A and the second portion 101B. The second portion 101B is located away from the medium facing surface 80, and the first portion 101A is located between the second portion 101B and the medium facing surface 80. The first portion 101A is smaller than the second portion 101B in thickness. These features of the present embodiment make it possible to prevent the occurrence of adjacent track erasure attributable to the seed layer 101.

The above explanations also hold true for the seed layers 102 to 104 and 107. In the present embodiment, each of the seed layers 102 to 104 and 107 has the first portion and the second portion. The second portion is located away from the medium facing surface 80, and the first portion is located between the second portion and the medium facing surface 80. The first portion is smaller than the second portion in thickness. These features of the present embodiment make it possible to prevent the occurrence of adjacent track erasure attributable to the seed layers 102 to 104 and 107.

The seed layer 91 may be made of a material the same as or different from the material of the first shield 16A and the seed layer 81. The seed layer 92 may be made of a material the same as or different from the material of the second shield 16B and the seed layer 82. The seed layers 93 and 94 may be made of a material the same as or different from the material of the side shields 16C and 16D and the seed layers 83 and 84. The seed layer 97 may be made of a material the same as or different from the material of the magnetic layer 42 and the seed layer 87.

The method of manufacturing the magnetic head according to the present embodiment will now be described. The method for manufacturing the magnetic head according to the present embodiment is different from the method according to the first embodiment in forming the seed layers 101 to 108. A description will now be given of the steps relating to the seed layers 101 to 108 with reference to FIG. 26 to FIG. 34. FIG. 26 to FIG. 34 each show a stack of layers formed in the process of manufacturing the magnetic head. In FIG. 26 to FIG. 34, the symbol "ABS" indicates the position at which the medium facing surface 80 is to be formed. In FIG. 26 to FIG. 29, FIG. 33, and FIG. 34, the symbol "ABS" particularly indicates a position on the top surface of the uppermost layer of the stack at which the medium facing surface 80 is to be formed.

Figure 26:
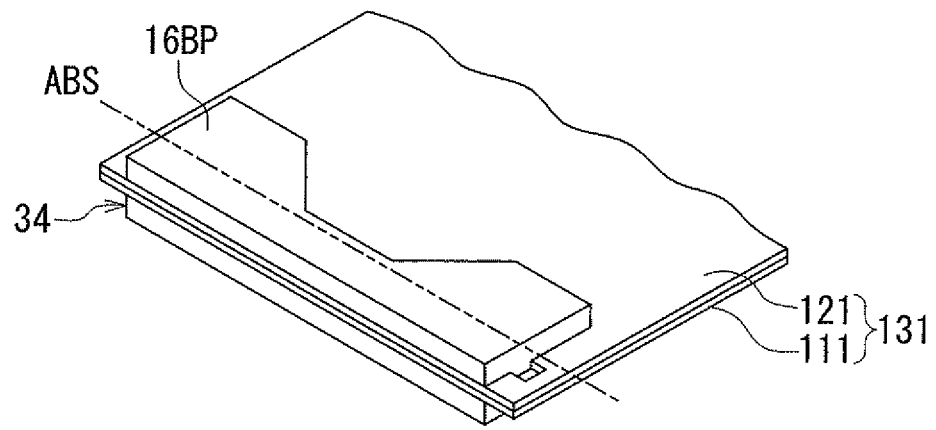
FIG. 26 is a perspective view showing the step forming of a seed layer for use for the sake of the second shield in a method of manufacturing the magnetic head according to the third embodiment of the invention.

First, the steps relating to the seed layers 102 and 105 will be described with reference to FIG. 26 and FIG. 27. FIG. 26 shows the step of forming a seed layer for use for the sake of the second shield 16B (the second preliminary shield 16BP). This step follows the step of FIG. 10 of the first embodiment. In this step, first, a seed layer 121 including the seed layers 92 and 95 is formed by physical vapor deposition, such as sputtering, to cover the first region 34*b*1 (see FIG. 10) of the top surface 34*b* of the magnetic layer 34 exposed from the opening 111*a* of the seed layer 111 and the top surface of the seed layer 111. Hereinafter, the combination of the seed layers 111 and 121 will be referred to as a seed layer 131. The seed layer 131 includes the seed layers 102 and 105. Using the seed layer 131 as the seed and the cathode, a second preliminary shield 16BP, which is to later become the second shield 16B, and the magnetic layer 36 (see FIG. 24) are formed on the seed layer 131 by plating. As shown in FIG. 23 and FIG. 24, the plating film to become the second preliminary shield 16BP (the second shield 16B) grows in the direction perpendicular to the top surface 1*a* of the substrate 1.

Figure 27:
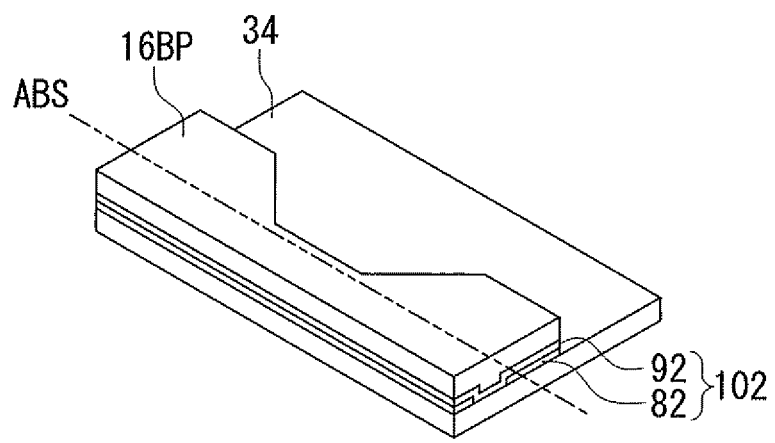
FIG. 27 is a perspective view showing a step that follows the step shown in FIG. 26.

FIG. 27 shows the next step. In this step, using the second preliminary shield 16BP and the magnetic layer 36 as an etching mask, the seed layer 131 except portions thereof lying under the second preliminary shield 16BP and the magnetic layer 36 is removed by IBE, for example. The seed layer 131 is thereby separated into the seed layer 102 and the seed layer 105 (see FIG. 24).

Figure 28:
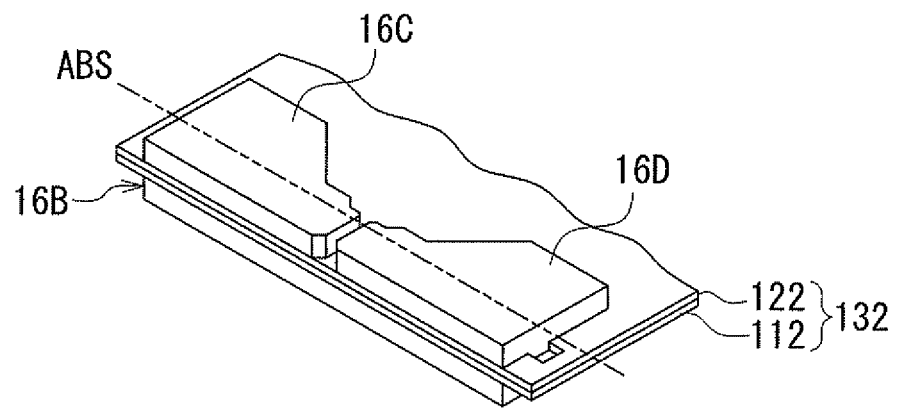
FIG. 28 is a perspective view showing the step of forming a seed layer for use for the sake of the side shields in the method of manufacturing the magnetic head according to the third embodiment of the invention.

The steps relating to the seed layers 103 and 104 will now be described with reference to FIG. 28 and FIG. 29. FIG. 28 shows the step of forming a seed layer for use for the sake of the side shields 16C and 16D. This step follows the step of FIG. 13 of the first embodiment. In this step, first, a seed layer 122 including the seed layers 93 and 94 is formed by physical vapor deposition, such as sputtering, to cover the first region 16Bb1 (see FIG. 13) of the top surface 16Bb of the second shield 16B exposed from the opening 112*a* of the seed layer 112 and the top surface of the seed layer 112. Hereinafter, the combination of the seed layers 112 and 122 will be referred to as a seed layer 132. The seed layer 132 includes the seed layers 103 and 104. Using the seed layer 132 as the seed and the cathode, the side shields 16C and 16D are then formed on the seed layer 132 by plating. As shown in FIG. 23, the plating films to become the side shields 16C and 16D grow in the direction perpendicular to the top surface 1*a* of the substrate 1.

Figure 29:
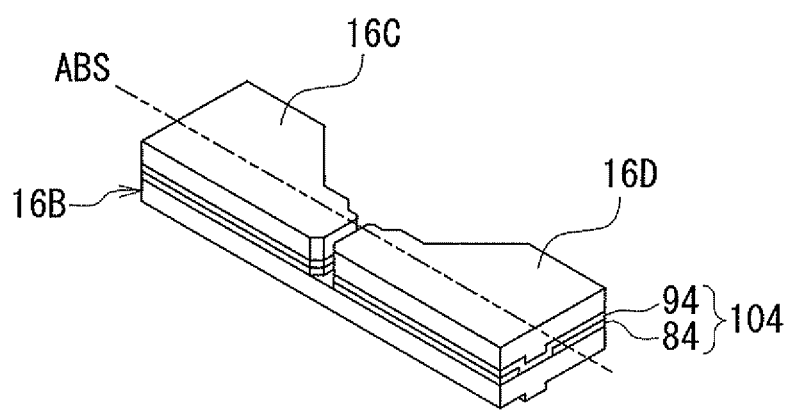
FIG. 29 is a perspective view showing a step that follows the step shown in FIG. 28.

FIG. 29 shows the next step. In this step, using the side shields 16C and 16D as an etching mask, the seed layer 132 except portions thereof lying under the side shields 16C and 16D is removed by IBE, for example. The seed layer 132 is thereby separated into the seed layer 103 (see FIG. 23 and FIG. 25) and the seed layer 104.

Figure 30:
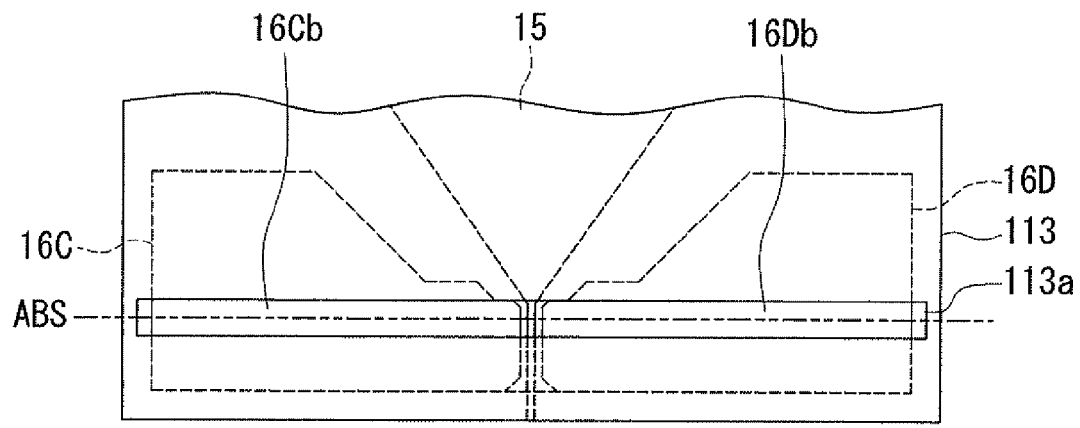
FIG. 30 is a plan view showing the step of forming a seed layer for use for the sake of a first shield in the method of manufacturing the magnetic head according to the third embodiment of the invention.

The steps relating to the seed layers 101 and 106 will now be described with reference to FIG. 30 to FIG. 32. FIG. 30 shows the step of forming a seed layer for use for the sake of the first shield 16A. This step follows the selective etching of the first gap layer 19, the nonmagnetic metal layer 58 and the insulating layer 59. The first gap layer 19, the nonmagnetic metal layer 58 and the insulating layer 59 are omitted from FIG. 30. In this step, first, a seed layer 113 including the seed layers 81 and 86 is formed over the main pole 15, the side shields 16C and 16D, the first gap layer 19 and the first nonmagnetic layer (not shown) by physical vapor deposition such as sputtering. The seed layer 113 is then selectively etched to form therein an opening 113*a* for exposing respective portions of the top surface 16Cb of the side shield 16C, the top surface 16Db of the side shield 16D, and the top surface of the first gap layer 19, the portions being located in the vicinity of the position ABS at which the medium facing surface 80 is to be formed.

Figure 31:
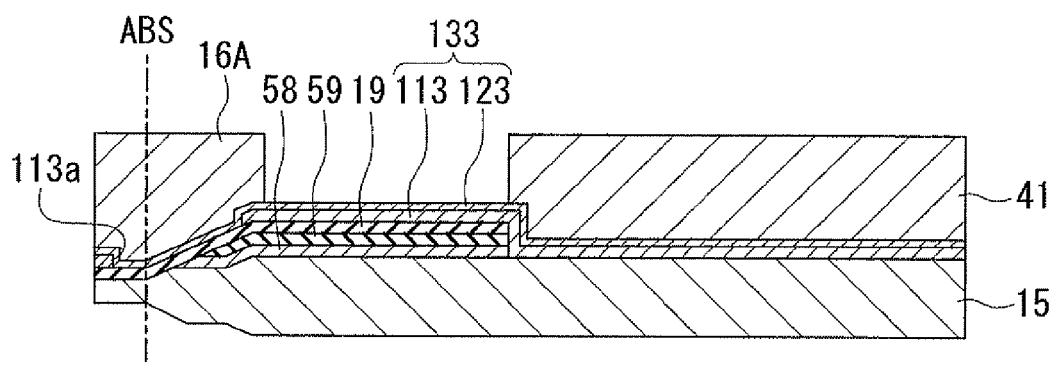
FIG. 31 is a cross-sectional view showing a step that follows the step shown in FIG. 30.

FIG. 31 shows the next step. In this step, first, a seed layer 123 including the seed layers 91 and 96 is formed by physical vapor deposition, such as sputtering, to cover the portions of the top surface 16Cb of the side shield 16C, the top surface 16Db of the side shield 16D and the top surface of the first gap layer 19 that are exposed from the opening 113*a* and also cover the top surface of the seed layer 113. Hereinafter, the combination of the seed layers 113 and 123 will be referred to as a seed layer 133. The seed layer 133 includes the seed layers 101 and 106. Using the seed layer 133 as the seed and the cathode, the first shield 16A and the magnetic layer 41 are then formed on the seed layer 133 by plating. As shown in FIG. 24, the plating film to become the first shield 16A grows in the direction perpendicular to the top surface 1*a* of the substrate 1.

Figure 32:
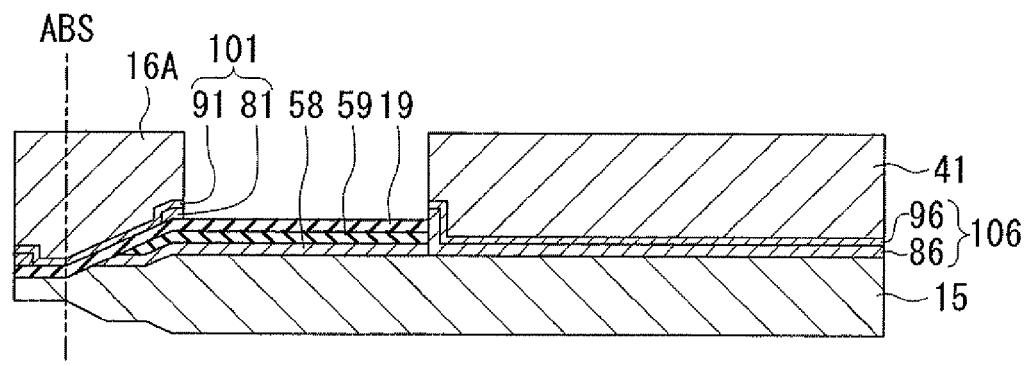
FIG. 32 is a cross-sectional view showing a step that follows the step shown in FIG. 31.

FIG. 32 shows the next step. In this step, using the first shield 16A and the magnetic layer 41 as an etching mask, the seed layer 133 except portions thereof lying under the first shield 16A and the magnetic layer 41 is removed by IBE, for example. The seed layer 133 is thereby separated into the seed layers 101 and 106. Where the first gap layer 19 is made of a nonmagnetic conductive material such as Ru, the first gap layer 19 may be etched at the same time the seed layer 133 is etched. Where the first gap layer 19 includes a first layer of a nonmagnetic insulating material and a second layer of a nonmagnetic conductive material stacked on the first layer, only the second layer may be etched at the same time the seed layer 133 is etched.

Figure 33:
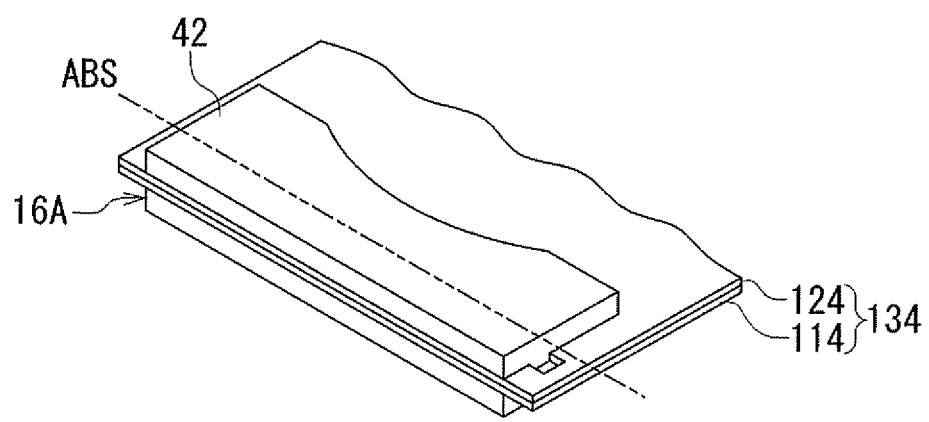
FIG. 33 is a perspective view showing the step of forming a seed layer for use for the sake of a magnetic layer of the first return path section in the method of manufacturing the magnetic head according to the third embodiment of the invention.

The steps relating to the seed layers 107 and 108 will now be described with reference to FIG. 33 and FIG. 34. FIG. 33 shows the step of forming a seed layer for use for the sake of the magnetic layer 42. This step follows the step of FIG. 16 of the first embodiment. In this step, first, a seed layer 124 including the seed layers 97 and 98 is formed by physical vapor deposition, such as sputtering, to cover the first region 16Ab1 (see FIG. 16) of the top surface 16Ab of the first shield 16A exposed from the opening 114*a* of the seed layer 114 and the top surface of the seed layer 114. Hereinafter, the combination of the seed layers 114 and 124 will be referred to as a seed layer 134. The seed layer 134 includes the seed layers 107 and 108. Using the seed layer 134 as the seed and the cathode, the magnetic layer 42 and the magnetic layer 43 (see FIG. 24) are then formed on the seed layer 134 by plating. As shown in FIG. 24, the plating film to become the magnetic layer 42 grows in the direction perpendicular to the top surface 1*a* of the substrate 1.

Figure 34:
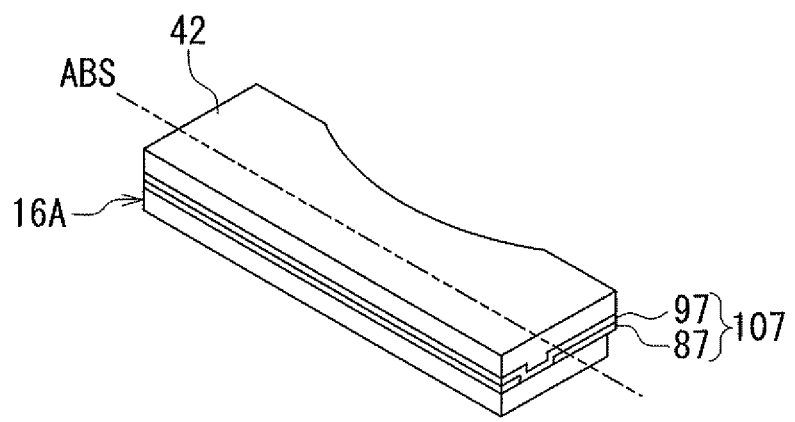
FIG. 34 is a perspective view showing a step that follows the step shown in FIG. 33.

FIG. 34 shows the next step. In this step, using the magnetic layers 42 and 43 as an etching mask, the seed layer 134 except portions thereof lying under the magnetic layers 42 and 43 is removed by IBE, for example. The seed layer 134 is thereby separated into the seed layer 107 and the seed layer 108 (see FIG. 24).

According to the present embodiment, it is possible to form the seed layer 101 having the above-described shape by first forming the seed layer 113 including the seed layer 81 and thereafter forming the seed layer 123 including the seed layer 91. It is possible to form the seed layer 102 having the above-described shape by first forming the seed layer 111 including the seed layer 82 and thereafter forming the seed layer 121 including the seed layer 92. It is possible to form the seed layers 103 and 104 having the above-described shape by first forming the seed layer 112 including the seed layers 83 and 84 and thereafter forming the seed layer 122 including the seed layers 93 and 94. It is possible to form the seed layer 107 having the above-described shape by first forming the seed layer 114 including the seed layer 87 and thereafter forming the seed layer 124 including the seed layer 97.

The remainder of configuration, function and effects of the present embodiment are similar to those of the first embodiment.

Fourth Embodiment

Figure 35:
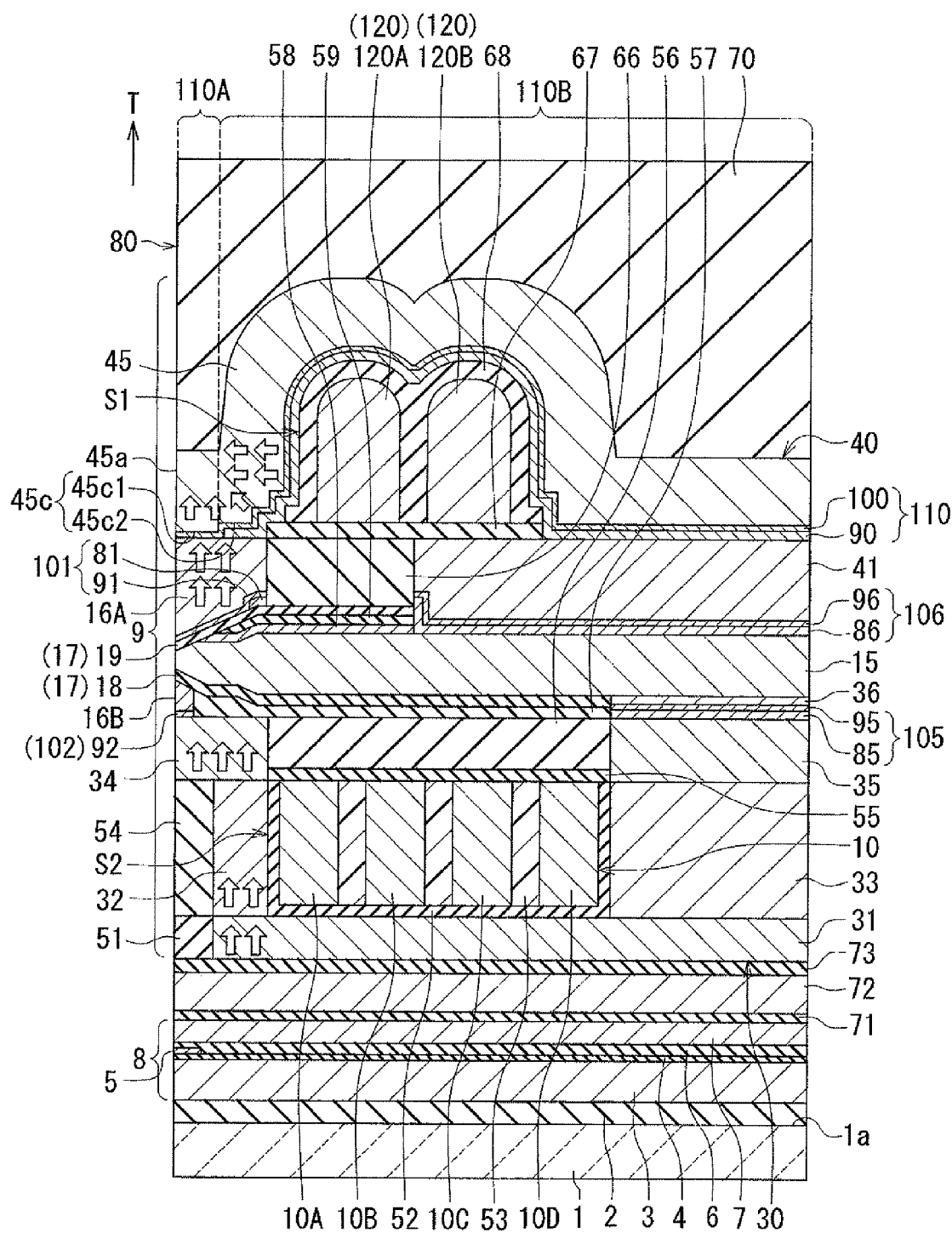
FIG. 35 is a cross-sectional view of a magnetic head according to a fourth embodiment of the invention.

A magnetic head according to a fourth embodiment of the invention will now be described with reference to FIG. 35. FIG. 35 is a cross-sectional view of the magnetic head according to the present embodiment. Note that FIG. 35 shows a cross section perpendicular to the medium facing surface and to the top surface of the substrate, or the main cross section, in particular.

The configuration of the magnetic head according to the present embodiment is different from that of the magnetic head according to the third embodiment in the following respects. The magnetic head according to the present embodiment does not have the insulating films 61 and 63, the insulating layers 62 and 64, the seed layer 89, the seed layer 107 (the seed layers 87 and 97) and the seed layer 108 (the seed layers 88 and 98), but has the first portion 120 of the coil, the magnetic layer 45, the insulating layers 67 and 68, and the seed layer 90. The shapes and the arrangement of the magnetic layer 45, the first portion 120, the insulating layers 67 and 68, and the seed layer 90 are the same as those in the second embodiment.

The first return path section 40 of the present embodiment includes a seed layer 100 having conductivity. The seed layer 100 is interposed between the magnetic layer 45 and each of the first shield 16A and the seed layer 90. Hereinafter, the combination of the seed layers 90 and 100 will be referred to as a seed layer 110. As will be described in detail later, the seed layer 110 is used in forming the magnetic layer 45 by plating.

The seed layer 110 includes a first portion 110A and a second portion 110B. The second portion 110B is located away from the medium facing surface 80. The first portion 110A is located between the second portion 110B and the medium facing surface 80. A portion of the seed layer 100 that is closer to the medium facing surface 80 than is the seed layer 90 constitutes the first portion 110A, and the other portion of the seed layer 100 constitutes the second portion 110B in conjunction with the seed layer 90. The first portion 110A is smaller than the second portion 110B in thickness. The first region $45c1$ of the bottom surface $45c$ of the magnetic layer 45 is in contact with the first portion 110A, and the second region $45c2$ is in contact with the second portion 110B.

The thickness of the first portion 110A is equal to that of the seed layer 100. The thickness of the seed layer 100 is preferably in the range of 1 to 10 nm, and more preferably in the range of 3 to 6 nm.

According to the present embodiment, the seed layer 110 can be reduced in thickness in the vicinity of the medium facing surface 80 so as to prevent the occurrence of adjacent track erasure attributable to the seed layer 110. The seed layer 100 may be made of a material the same as or different from the material of the magnetic layer 45 and the seed layer 90.

A method of manufacturing the magnetic head according to the present embodiment will now be described. The method of manufacturing the magnetic head according to the present embodiment is the same as the method according to the third embodiment up to the step of forming the first shield 16A and the magnetic layer 41, and is the same as the method according to the second embodiment up to the step of forming the opening in the seed layer 90.

In the present embodiment, the seed layer 100 is then formed by physical vapor deposition, such as sputtering, to cover the first region 16Ab1 (see FIG. 19) of the top surface 16Ab of the first shield 16A exposed from the opening of the seed layer 90 and the top surface of the seed layer 90. The seed layer 110 is thereby formed. Next, the magnetic layer 45 is formed on the seed layer 110 by plating, using the seed layer 110 as the seed and the cathode. Then, using the magnetic layer 45 as an etching mask, the seed layer 110 except a portion thereof lying under the magnetic layer 45 is removed by IBE, for example. The subsequent steps are the same as those in the second embodiment.

According to the present embodiment, it is possible to form the seed layer 110 having the above-described shape by first forming the seed layer 90 and thereafter forming the seed layer 100.

The remainder of configuration, function and effects of the present embodiment are similar to those of the second or third embodiment.

The present invention is not limited to the foregoing embodiments, and various modifications may be made thereto. For example, in the first embodiment, the seed layer 81 may be replaced with the seed layer 101 of the third embodiment.

The magnetic structure MS need not necessarily incorporate all of the write shield 16, the first return path section 40 and the second return path section 30, and may incorporate only the write shield 16.

The top surface 15T of the main pole 15 need not necessarily have the second portion and the third portion. The bottom end 15L of the main pole 15 need not necessarily have the second portion and the third portion.

It is apparent that the present invention can be carried out in various forms and modifications in the light of the foregoing descriptions. Accordingly, within the scope of the following claims and equivalents thereof, the present invention can be carried out in forms other than the foregoing most preferred embodiments.

What is claimed is:

1. A magnetic head for perpendicular magnetic recording, comprising:
   a medium facing surface that faces a recording medium;
   a coil that produces a magnetic field corresponding to data to be written on the recording medium;
   a main pole that has an end face located in the medium facing surface, the main pole allowing a magnetic flux that corresponds to the magnetic field produced by the coil to pass, and producing a write magnetic field for writing the data on the recording medium by means of a perpendicular magnetic recording system;
   a magnetic structure made of a magnetic material and incorporating a write shield; and
   a gap part made of a nonmagnetic material and interposed between the main pole and the write shield, wherein:
   the write shield has an end face located in the medium facing surface;

the magnetic structure is formed to include a first magnetic layer, a second magnetic layer stacked on the first magnetic layer, and a seed layer having electrical conductivity;

the first magnetic layer has a front end face located in the medium facing surface and a top surface facing toward the second magnetic layer;

the second magnetic layer has a front end face located in the medium facing surface and a bottom surface facing toward the first magnetic layer;

the top surface of the first magnetic layer includes a first region including an end located in the medium facing surface and a second region that is located farther from the medium facing surface than is the first region;

the seed layer is not present on the first region of the top surface of the first magnetic layer but is present on the second region of the top surface of the first magnetic layer; and the bottom surface of the second magnetic layer includes a first region in contact with the first region of the top surface of the first magnetic layer and a second region in contact with the seed layer.

2. The magnetic head for perpendicular magnetic recording according to claim 1, wherein each of the first magnetic layer and the second magnetic layer is a component of the write shield.

3. The magnetic head for perpendicular magnetic recording according to claim 1, wherein:
the magnetic structure further incorporates a return path section that connects the write shield and part of the main pole away from the medium facing surface to each other;
the first magnetic layer is a component of the return path section; and
the second magnetic layer is a component of the write shield.

4. The magnetic head for perpendicular magnetic recording according to claim 1, wherein:
the magnetic structure further incorporates a return path section that connects the write shield and part of the main pole away from the medium facing surface to each other;
the first magnetic layer is a component of the write shield; and
the second magnetic layer is a component of the return path section.

5. A method of manufacturing the magnetic head for perpendicular magnetic recording of claim 1, comprising the steps of:
forming the coil;
forming the main pole;
forming the magnetic structure; and
forming the gap part,
wherein the step of forming the magnetic structure includes the steps of:
forming the first magnetic layer;
forming the seed layer; and
forming the second magnetic layer by plating with the seed layer and the first magnetic layer used as a seed and a cathode.

6. The method of manufacturing the magnetic head for perpendicular magnetic recording according to claim 5, wherein the step of forming the magnetic structure further includes the step of removing part of the seed layer after the second magnetic layer is formed.

7. The method of manufacturing the magnetic head for perpendicular magnetic recording according to claim 5, wherein each of the first magnetic layer and the second magnetic layer is a component of the write shield.

8. The method of manufacturing the magnetic head for perpendicular magnetic recording according to claim 5, wherein:
the magnetic structure further incorporates a return path section that connects the write shield and part of the main pole away from the medium facing surface to each other;
the first magnetic layer is a component of the return path section; and
the second magnetic layer is a component of the write shield.

9. The method of manufacturing the magnetic head for perpendicular magnetic recording according to claim 5, wherein:
the magnetic structure further incorporates a return path section that connects the write shield and part of the main pole away from the medium facing surface to each other;
the first magnetic layer is a component of the write shield; and
the second magnetic layer is a component of the return path section.

* * * * *